Sept. 11, 1962 H. W. CHRISTENSON ET AL 3,053,116
TRANSMISSION
Filed April 25, 1958 6 Sheets-Sheet 1
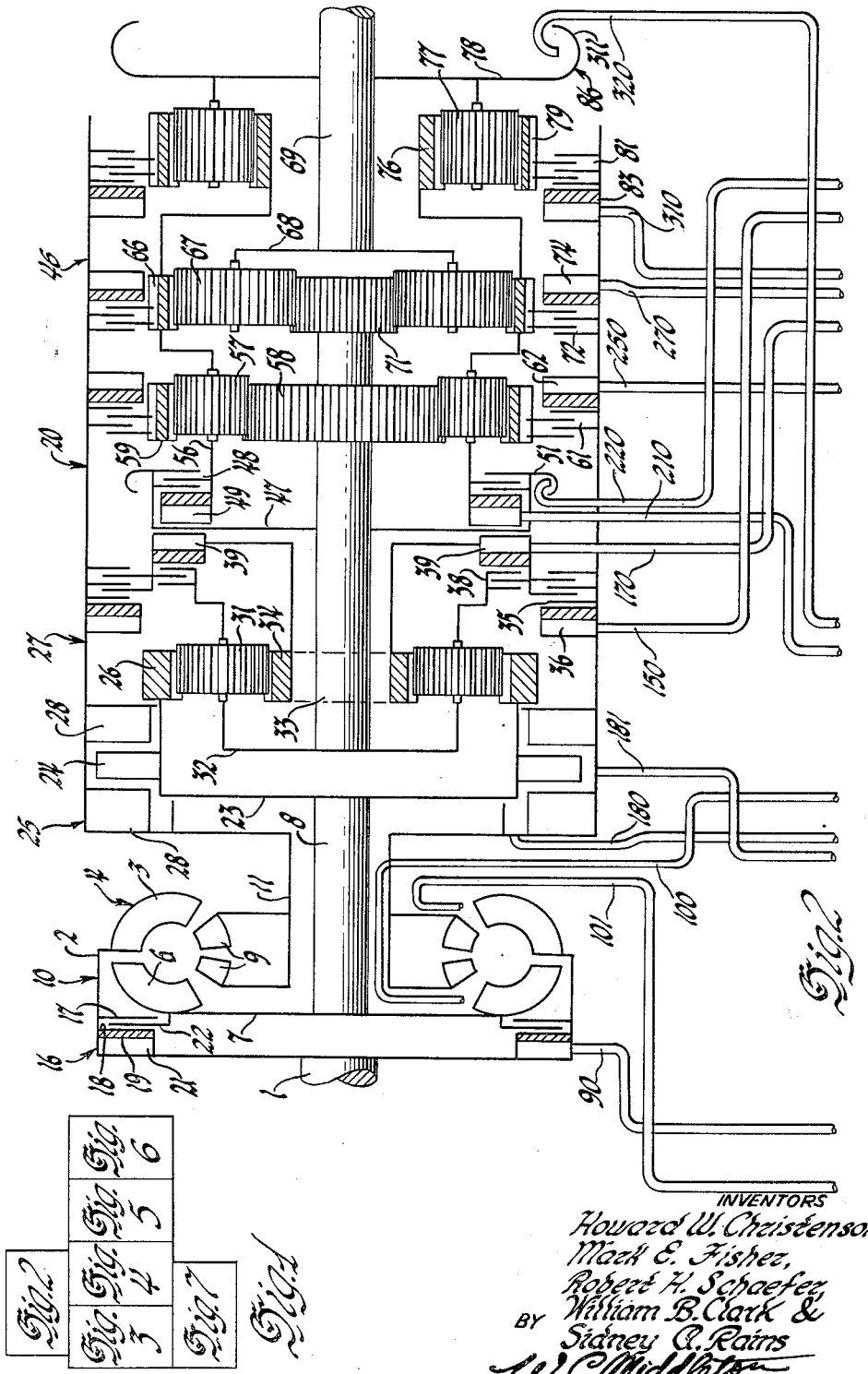
INVENTORS
Howard W. Christenson,
Mark E. Fisher,
Robert H. Schaefer,
William B. Clark &
BY Sidney C. Rains
W. C. Middleton
ATTORNEY

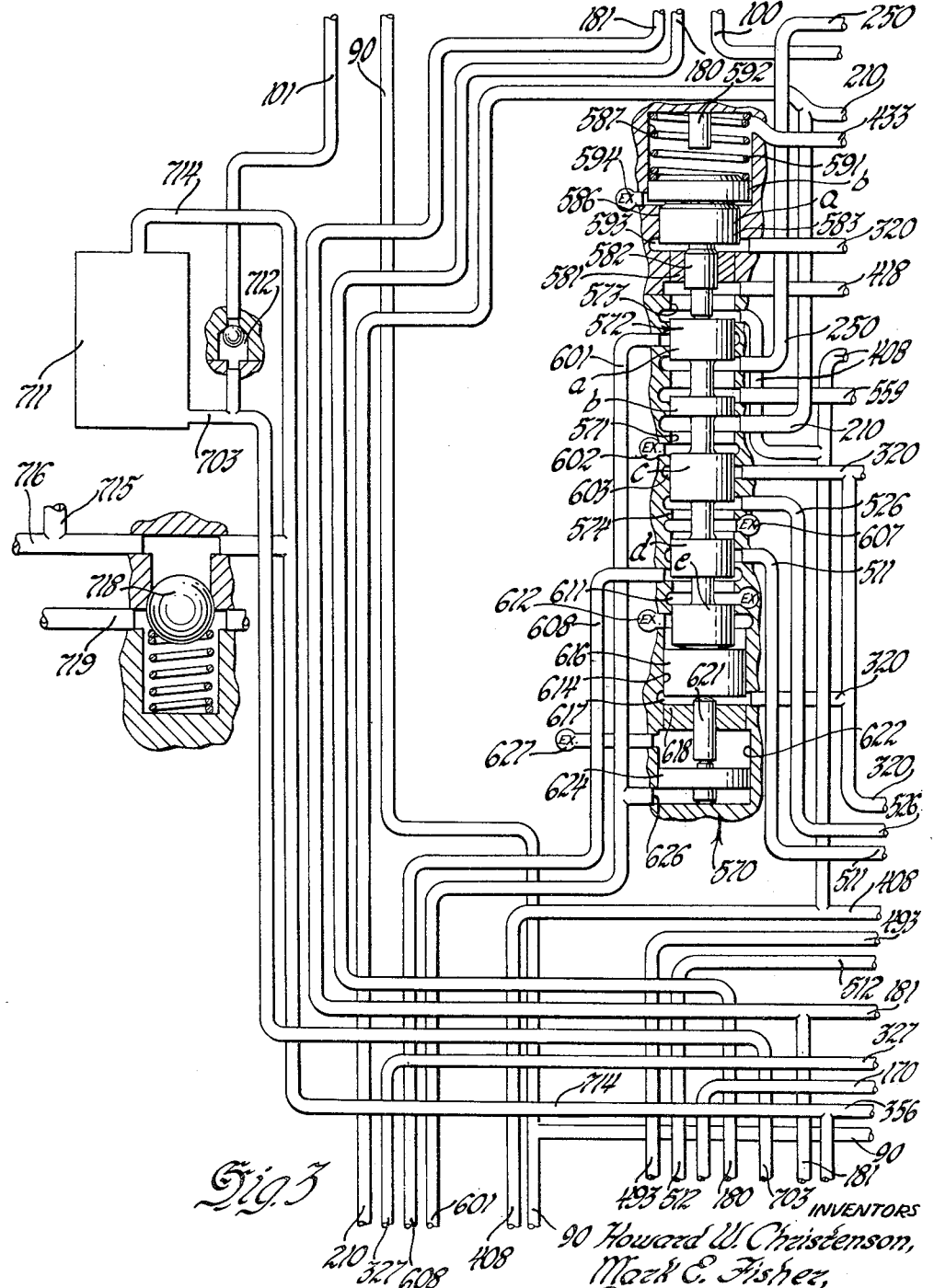

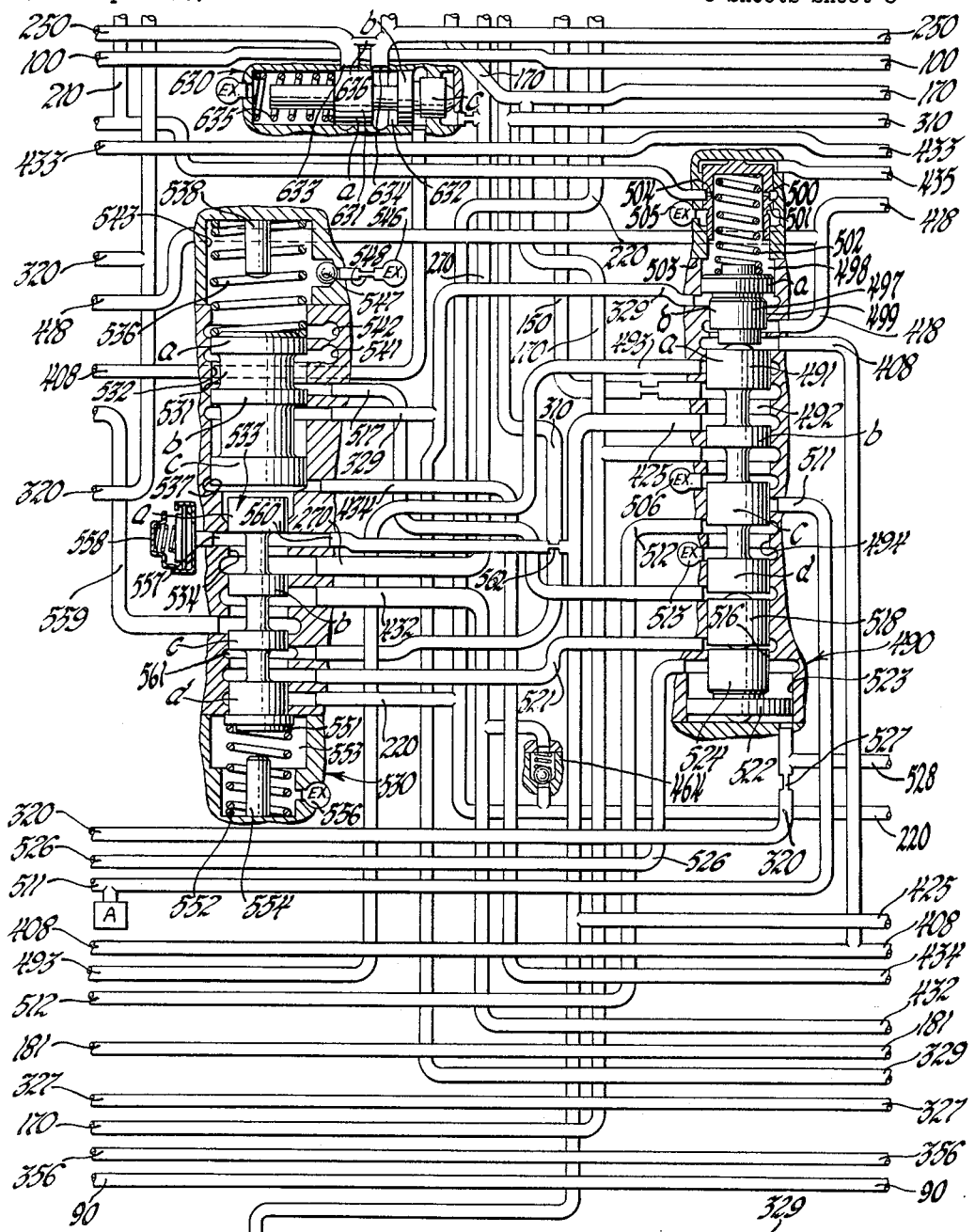

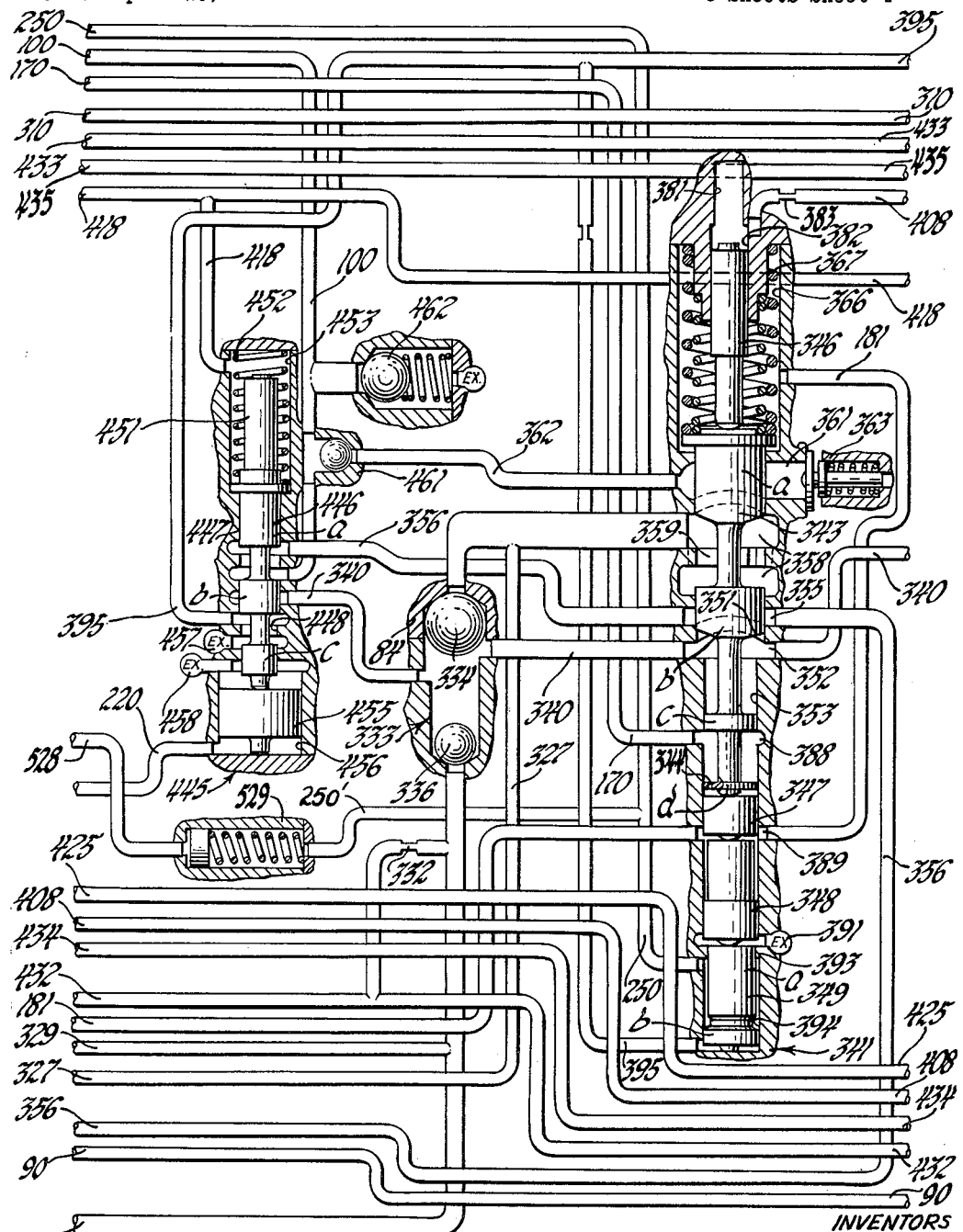

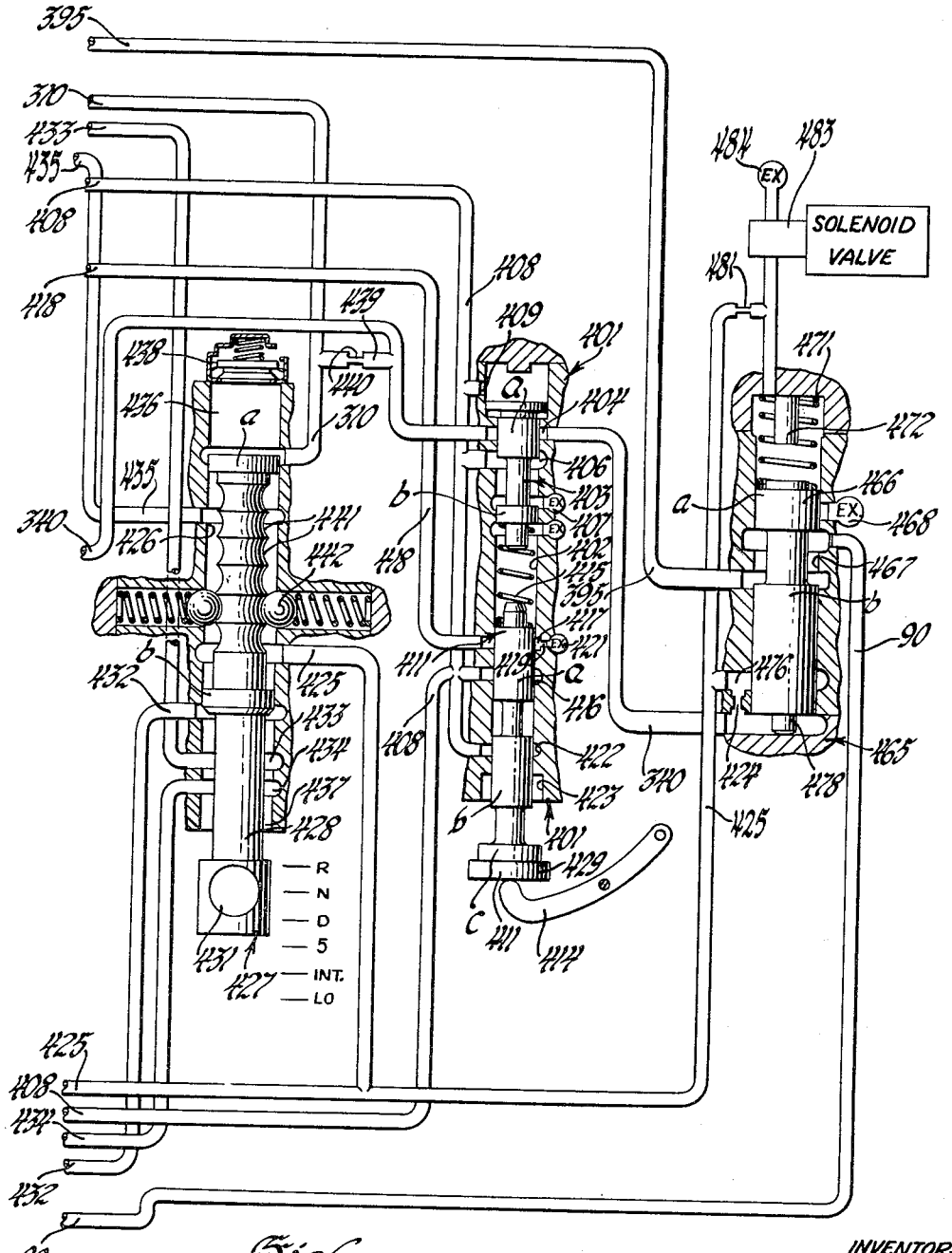

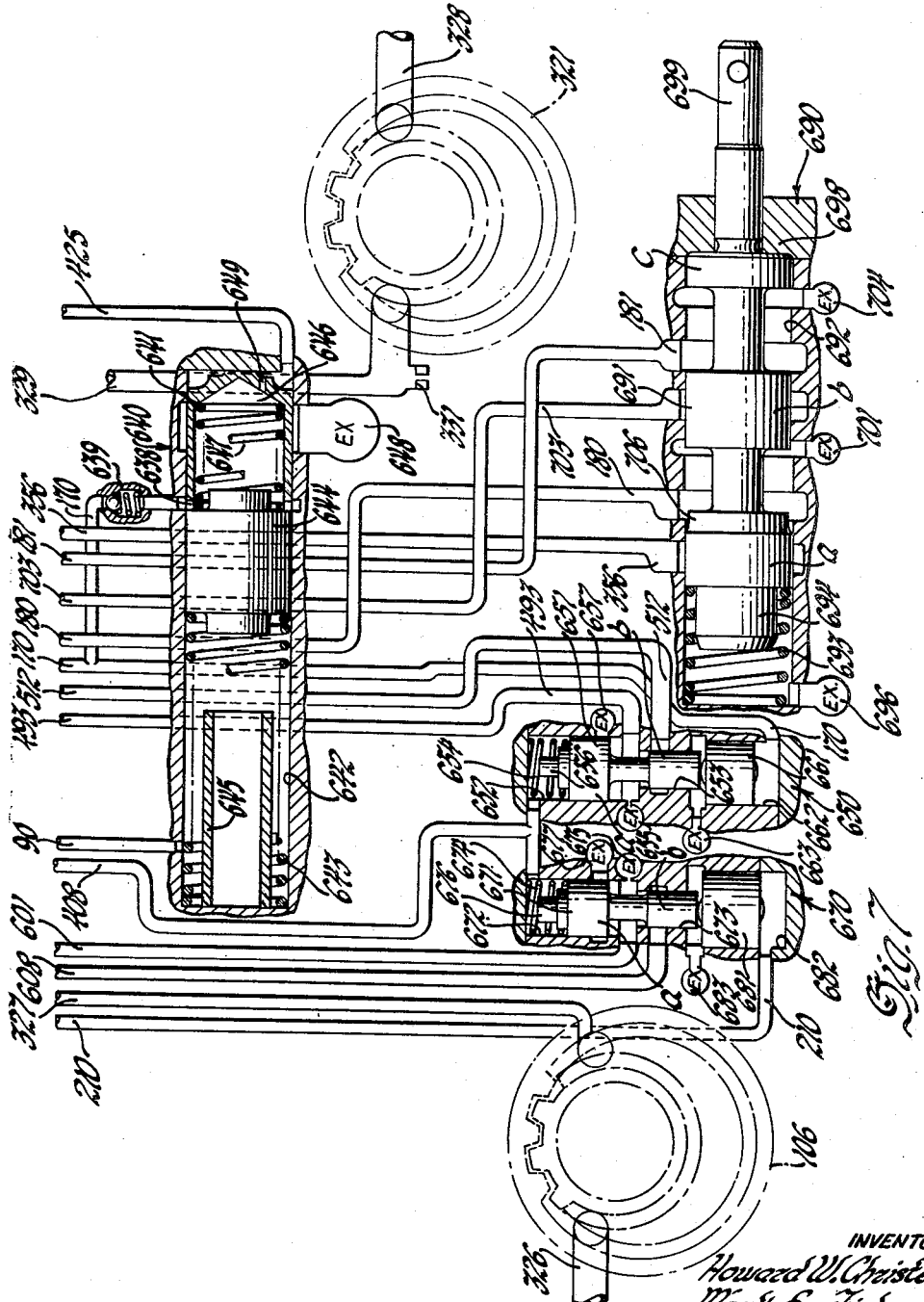

United States Patent Office 3,053,116
Patented Sept. 11, 1962

3,053,116
TRANSMISSION
Howard W. Christenson, Indianapolis, Mark E. Fisher, Carmel, Robert H. Schaefer, Indianapolis, William B. Clark, Greenwood, and Sidney A. Rains, Speedway City, Ind., assignors to General Motors Corporation, Detroit, Mich., a corporation of Delaware
Filed Apr. 25, 1958, Ser. No. 731,047
45 Claims. (Cl. 74—752)

This invention relates to an automatic transmission and more particularly to an automatic control system for a transmission having a torque converter, a lock-up clutch and a multiratio gear unit.

The transmission drive train includes a torque converter and lock-up clutch unit, a hydrodynamic brake and a six-speed and reverse gear unit. The gear unit includes a two-speed splitter unit and a three-speed and reverse unit. The control system is manually controlled for operation in a plurality of ranges in which the automatic control system will control the transmission gearing to provide a drive in certain ratios in accordance with transmission speed and throttle pedal position. This application is an improvement over the assignee's co-pending application S.N. 554,866, entitled "Transmission," filed December 22, 1955, by Howard W. Christenson, Mark E. Fisher and Edward T. Mabley.

To operate the transmission the operator places the selector valve in the desired range position. The selector valve by means of a plurality of range signal pressures controls the operation of the ratio shift valves to provide a specific limited range of ratios in each range of transmission operation. This transmission provides for selection of a reverse range providing one reverse ratio, a neutral range providing a positive neutral, a drive range providing automatic shifting between third and sixth ratios, an intermediate range providing automatic shifting between third and fourth ratios and a low range providing automatic shifting between the first and second ratios, as in the above application S.N. 554,866, and in addition a fifth gear hold range located between the drive and intermediate ranges which provides automatic shifting between third and fifth ratios. In reverse range, reverse in the three-speed unit and underdrive in the splitter unit are engaged to provide a single reverse ratio. In low range a splitter shift valve automatically controls the two-speed unit to provide first and second ratios in conjunction with low ratio in the three-speed unit. In intermediate ratio the low intermediate shift valve is shifted to engage intermediate ratio in the three-speed unit and the splitter shift valve is controlled by governor and throttle to provide third and fourth ratios. In drive range third and fourth ratios are provided as in intermediate range and the intermediate high shift valve is controlled by governor and throttle to upshift the three-speed unit to high ratio in conjunction with modified splitter shift valve control to provide fifth or sixth ratios. In fifth gear hold range which is desirable under some driving conditions requiring performance or during the operation of the hydrodynamic brake the splitter shift valve is held in splitter low so that only third to fifth ratios are available.

The main regulator valve for the fluid supply of this control system regulates the pressure at levels varied by the throttle pedal position, the splitter high and intermediate clutch pressures, the lock-up pressure and the hydrodynamic brake pressure. In addition, during the application of each ratio engaging device the fluid pressure is regulated by a trimmer valve which initially reduces the pressure and then permits a slow controlled increase of pressure controlled by the pressure in the ratio engaging line to increase this pressure to main line pressure. The lock-up clutch is also disengaged by the lock-up cut-off valve during each engagement of the ratio engaging device and on re-engagement of the lock-up clutch the trimmer valve is positively reset for another regulating cycle.

The lock-up clutch may be manually released at any time to prevent lugging of the engine. In reverse drive the splitter high shift valve may be held in low position preventing an upshift to a second reverse ratio. The lock-up clutch engagement in reverse is prevented regardless of the action of the governor and throttle controls. The rear governor connection to the splitter shift valve has an accumulator to soften the action of the rear governor pressure on the splitter valve except in intermediate ratio. In intermediate ratio the intermediate pressure holds the accumulator piston so that fluid will not be received by the accumulator.

An object of the invention is to provide in a transmission having a hydrodynamic brake and a multiratio gear unit connecting the hydrodynamic brake to the driven element, an automatic range control providing a selection of ranges in automatic multiratio transmission control operation successively omitting the one and the two highest gear ratios.

Another object of the invention is to provide in a multiratio transmission an automatic control system providing for the selection of a drive range permitting automatic shifting between a plurality of intermediate ratios and a plurality of higher ratios, a hold range permitting automatic shifting between the intermediate ratios and the lower of the high ratios and a second intermediate range permitting automatic shifting between the intermediate ratios, and a low ratio permitting automatic shifting between ratios less than the intermediate ratios.

Another object of the invention is to provide in an atuomatic transmission having a torque converter, a lock-up clutch, a multiratio gear unit, an automatic control system for engaging each of said plurality of ratios, and a control for disengaging the lock-up clutch during engagement of each ratio; a regulator valve to regulate the main line pressure during the engagement of each ratio controlled by the lock-up shift valve to terminate regulation upon re-engagement of the lock-up clutch.

Another object of the invention is to provide in a transmission having a torque converter, a lock-up clutch, and a multiratio gear unit; a control system providing for automatic engagement of the lock-up clutch and selective engagement of the ratios of the multiratio gear unit having a control responsive to the engagement of the gear unit to disable the lock-up clutch and initiate operation of a regulator valve to regulate the engaging pressure for each ratio engagement at an initial low value and to increase the pressure to a higher value and means responsive to the control to terminate the operation and reset the regulator valve for the next ratio change.

Another object of the invention is to provide in a transmission having a torque converter, a lock-up clutch, and a multiratio gear unit; a control providing automatic operation of the lock-up clutch in forward ratios but not in reverse.

Another object of the invention is to provide in an automatic transmission having a lock-up clutch automatically controlled responsive to transmission speed, a manually actuated control to actuate the lock-up clutch at the will of the operator.

Another object of the invention is to provide in an automatic transmission having a plurality of fluid operated drive ratios, and automatic shift valves responsive to transmission speed controlling the ratios, an accumulator connected to control each of the speed responsive pressures to soften the shifts between ratios.

Another object of the invention is to provide in an automatic transmission providing a plurality of fluid controlled drive ratios, an automatic shift valve actuated by a speed responsive pressure to control transmission drive ratios, an accumulator connected to a speed responsive pressure line to soften the action of the shift valve and a control pressure responsive to the operation of the transmission in one ratio to disable the accumulator.

These and other objects of the invention will be more apparent from the following description and drawings of the preferred embodiment of the invention.

The drawing has FIGURES 2, 3, 4, 5, 6 and 7 arranged in accordance with the schematic diagram shown in FIG. 1.

Transmission Drive Train

The drive train illustrated diagrammatically in FIG. 2 includes a torque converter and lock-up clutch unit 10, a hydrodynamic brake 25, and a six-speed and reverse gear unit 20. The engine or input shaft 1 is connected to drive the rotary torque converter housing 2 which carries the bladed pump or impeller 3 of the torque converter 4. The torque converter pump hydrokinetically drives the bladed turbine 6 which is mounted by disc 7 on the converter output shaft 8. The torque converter 4 also has two startors 9 which may be mounted by suitable one-way devices (not shown) on the ground sleeve 11. Fluid is supplied to the operating chamber of the converter by the converter inlet line 100 and exhausted by the outlet line 101 which are connected to the control system as explained below. The torque converter 4 provides in a conventional manner a shockless torque multiplying drive between the input shaft 1 and converter output shaft 8.

The input shaft 1 may also be connected to the converter output shaft 8 by the direct drive or lock-up clutch 16. The direct drive clutch 16 consists of a fixed plate 17 mounted on the rotary housing 2 and an axially movable plate 18 formed as a face of the annular piston 19 non-rotatably located in the cylinder 21. The driven plate 22 is located between the fixed plate 17 and the movable plate 18 and connected by disc 7 to shaft 8. When fluid is supplied through the lock-up clutch line 90 to the servo motor consisting of piston 19 and cylinder 21, the driven clutch plate 22 is engaged between the movable plate 18 and fixed plate 17 to engage the direct drive clutch 16.

The converter output shaft 8 is connected by disc 23 to drive the rotary vanes 24 of hydrodynamic brake 25 and the input ring gear 26 of splitter gear unit 27. The rotary vanes 24 of hydrodynamic brake 25 are located between two rows of fixed vanes 28 mounted within the brake chamber at each side of the rotary vanes. Fluid is supplied to the hydrodynamic brake chamber by inlet line 180 which is connected to the center of the brake and removed from the brake by the outlet line 181 which is connected at the perimeter of the brake chamber. The centrifugal action of the brake provides an outlet line pressure proportional to the torque absorbed by the brake due to the location of the outlet at the radial outer region of the brake chamber.

The converter output shaft 8 drives the input ring gear 26 of the planetary splitter gear unit 27 which meshes with planetary pinions 31 which are mounted on a carrier 32 secured to the connecting shaft 33. The splitter gear unit 27 is controlled by the sun gear 34 which meshes with the planetary pinions 31. To provide low or underdrive, the sun gear 34 is held by the brake or ratio engaging device 35 when actuated by motor 36 which, like all the motors in this transmission, consists of a piston and cylinder. The motors or the associated brakes or clutches for each ratio engaging device may have conventional retraction springs (not shown). The motor 36 is actuated by fluid supplied by the splitter underdrive line 150. The splitter unit 27 is placed in high or direct drive by engaging the clutch or ratio engaging device 38 which fixes the sun gear 34 to the connecting shaft 33. The clutch 38 is engaged by the motor 39 when fluid is supplied by the splitter direct line 170.

The splitter gear unit 27 is connected by the connecting shaft 33 to the three-speed and reverse planetary gear unit 46. The connecting shaft 33 is connected by driving element 47 to the high clutch or ratio engaging device 48 which is actuated by the high motor 49 supplied by the high ratio line 210.

The front pitot tube governor 51 has a can mounted on driving element 47 and a pitot tube on the housing to supply fluid to the front pitot governor line 220 at a pressure proportional to the speed of the splitter gear output or connecting shaft 33. The high clutch 48 rotates with element 47 and connects the driving element 47 to the carrier assembly 56. The carrier assembly includes the intermediate planetary pinions 57 which mesh with the intermediate sun gear 58 fixed to shaft 33 and intermediate ring gear 59. To provide intermediate ratio, the intermediate ring gear 59 is stopped by ratio brake or ratio engaging device 61 when actuated by the intermediate motor 62 under the control of fluid supplied by the intermediate clutch line 250. The carrier assembly 56 also includes the low ring gear 66 which meshes with the planetary pinions 67 mounted on carrier 68 fixed to output shaft 69. The low sun gear 71 fixed to shaft 33 meshes with planetary pinions 67. Low ratio is provided by stopping the ring gear 66 and incidentally the carrier assembly 56, by means of the low ratio brake or ratio engaging device 72 which is actuated by the motor 74 when pressure is supplied by the low clutch line 270.

The carrier assembly 56 also includes the reverse sun gear 76 which meshes with the reverse pinions 77 rotatably mounted on carrier 78 fixed to output shaft 69. The reverse ring gear 79 is held stationary for reverse drive by ratio brake or ratio engaging device 81 when engaged by motor 83 on the supply of fluid by the reverse clutch line 310.

The rear pitot governor 86 has a can mounted on carrier 78 to rotate with the output shaft 69 and a pitot tube fixed on the housing to supply the rear governor line 320 with a pressure proportional to output shaft speed.

Transmission Gearing Operation

This gearing arrangement provides six forward speed ratios and reverse by combining the two-speed ratios of the two-speed or splitter gear unit 27 and the three ratios and reverse of the three-speed and reverse unit 46. The splitter gear unit 27 has an input ring gear driven by the torque converter 4. When ratio device 35 is engaged to stop sun gear 34, the output pinions 31 and shaft 33 are driven at a reduced speed or underdrive ratio. When clutch 38 locks sun gear 34 to connecting shaft 33, the splitter gear is locked up to provide a high ratio or direct drive. The three-speed unit provides low ratio when the low ratio device 72 is engaged to hold low reaction ring gear 66 so that the input sun gear 71 drives pinions 67 and output shaft 69 at a reduced speed for low ratio. When intermediate ratio device 61 is engaged, the three-speed unit functions as a dual planetary gear. The intermediate reaction ring gear is held and the input sun gear 58 drives carrier 56 which rotates low ring gear 66 to drive, in conjunction with input sun gear 71, the output pinions 67 and shaft 69 at an intermediate ratio. High ratio is provided by engaging the high ratio device 48 to lock the carrier 56 to connecting shaft 33 to lock up the three-speed unit for direct drive or high ratio. Each of the six ratios is provided by engaging one ratio in the splitter gear unit 27 and one ratio in the three-speed unit and disengaging the other ratios. When the low ratio device 72 is engaged to provide low ratio in the three-speed unit 46, the transmission may be placed in either first ratio by placing the splitter gear unit 27 in underdrive by engaging device 35 or in second ratio by placing splitter gear unit 27 in direct drive by engaging device 38. When the three-speed unit 46 is placed in intermediate ratio by engaging device 61, the transmission may similarly be placed in third and fourth ratios by again engaging the underdrive or the direct drive respectively of the splitter gear unit 27. When the transmission is shifted to high ratio in the three-speed unit 46, the transmission may be placed in fifth ratio by shifting the splitter gear unit to underdrive and sixth ratio by shifting the splitter gear unit to direct drive.

Controls

The hydraulic control and lubrication system for this transmission is supplied with oil under pressure by the engine driven front pump 106 and output shaft driven rear pump 321 (FIG. 7). The front pump 106 draws the fluid such as oil via inlet line 326 from the transmission sump and is connected to deliver oil through the front pump line 327. The rear pump 321 draws oil from the sump through the inlet line 328 and is connected to deliver oil to the rear pump line 329. An orifice bleed 331 in line 329 feeds the rear governor can 311 and regulates the pressure in the rear pump line 329 so that it is proportional to pump speed and thus output shaft or vehicle speed to provide a second output speed responsive governor pressure. The rear pump 321 is primed by an orificed connection 332 (FIG. 5) between a front pump supply line, such as drive range line 432 and rear pump line 329.

Referring to FIG. 5 the front pump line 327 is connected through ball check valve 334 to the bore of dual check valve 333 and the rear pump line 329 is connected through ball check valve 336 to the bore of valve 333 which is connected to main line 340 to permit either pump to supply oil to the control system. The pressure in main line 340 is regulated by pressure control unit 341.

Pressure Control Unit

The pressure control unit 341 consists of a regulator valve 343 which is controlled by a throttle pressure regulator plug 346, brake regulator plugs 347 and 348 and lock-up knockdown plug 349. Regulator valve 343 has a large land $a$ at the upper or exhaust end, a large central land $b$ and smaller lands $c$ and $d$ at the other end. The lands $a$ and $b$ fit in the large diameter portion 351 of the valve bore located above the port 352 for main line 340. The lands $c$ and $d$ fit in the smaller diameter bore portion 353 located below the port 352. The land $d$ has an orifice 344 or a clearance in the bore to permit limited flow past the land. The main line 340 is always open via the port 352 through the valve. When the valve is in the closed position, as illustrated in FIG. 5, the land $b$ closes port 355 for the secondary line 356 which feeds the converter and brake. Oil supplied by the main line 340 fills the space between the unbalanced lands $b$ and $c$ and tends to move the valve up to uncover the port 355 to supply oil to the line 356. The port 358 located between the balanced lands $a$ and $b$ of valve 343 is connected to the front pump line 327. The port 358 is long and has intermediate its length a guide 359 which has slots to provide fluid communication between the two portions of the port. The oil in port 358 acts on the balanced areas $a$ and $b$ and thus does not tend to move the valve. With the valve in the closed position shown, the exhaust from port 358 to port 361 is blocked by land $a$, but in exhaust position line 327 is connected via port 358 to port 361. The exhaust from port 361 is connected to low pressure line 362 to provide a low pressure feed for the converter when the converter is not multiplying torque and the lock-up valve 445 (FIG. 5) has moved to engage the lock-up clutch 16. A low pressure is maintained in the port 361 by the pressure relief valve 363 which controls the exhaust from port 361. In valve unit 341 above regulator valve element 343 there is a spring chamber 366 which provides an abutment at one end for dual spring 367 acting upon the free end of the land 343$a$ to urge the valve 343 toward the closed position against the fluid force acting on the unbalanced area of lands $b$ and $c$.

When the oil in main line 340 between the unbalanced areas between lands $b$ and $c$ raises valve 343, the first increment of movement permits flow of oil to port 355 and secondary line 356. When the pressure in the main and secondary lines has reached a desired value, the valve will raise and land $a$ opens the port 361 and connects the front pump line 327 through port 358 directly to exhaust port 361 to supply the low pressure feed line 362 and exhaust excess oil through the pressure relief valve 363 to sump.

The regulated pressure in main line 340 is increased by the hydrodynamic brake pressure and the throttle valve pressure. The brake outlet pressure which is proportional to the torque being absorbed by the brake is conveyed by line 181 to spring chamber 366 and acts on the free end of land $a$ of valve 343 to assist the spring 367 to increase the regulated line pressure. The throttle plug 346 fits in the small end bore portion 382. The throttle pressure, which is a pressure proportional to the throttle pedal position as explained below in the description of the throttle valve unit 401 (FIG. 6), is supplied by line 408 to the bore portion 382 to act downwardly on the plug 346 and pressure regulator valve 343 assisting spring 367 and thus increasing the pressure in main line 340. An orifice 383 in the throttle line 408 connected to bore 382 damps and delays sudden variations in throttle pressure to prevent rapid changes in main line pressure. The plug 346 provides a stop to limit the upward movement of valve 343. When the brake pressure supplied by line 181 to spring cavity 366 increases the regulated pressure in line 340 by acting in a downward direction on the free end of land $a$ of valve 343, the brake pressure also acts upwardly on the plug 346 and partially or fully counteracts the pressure increasing effect due to the throttle pressure on plug 346 to prevent an excessive increase in main line pressure. However during normal operation, the throttle will be closed when the brake is applied so there will not be any throttle pressure. As explained below, the brake pressure also acts on the smaller area of plug 347 to decrease the main line pressure providing a net pressure increasing effect of a small value without employing a small land.

The main line pressure is reduced by the splitter high clutch pressure, brake pressure and the lock-up pressure from the governor and throttle controlled lock-up valve unit 445 (FIG. 5). With valve 343 in the closed position in FIG. 5, the bore 353 has a port 388, immediately below the land $c$, connected to the splitter high line 170. The brake regulator plug 347 is located between the port 388 and the port 389 connected to brake outlet line 181. The brake regulator sealing plug 348 is located below plug 347 between port 389 and exhaust port 391. The lock-up knockdown plug 349 below the plug 348 has a small diameter land $a$ abutting the sealing plug 348 and a larger diameter land $b$ at the other end. The bore 353 has a seal 393 adjacent the exhaust port 391 engaging the small diameter land 349$a$ and a large diameter bore portion 394 in which the land 349$b$ slides. The intermediate clutch line 250 is connected to the bore 394 below seal 393 to act down on the large land $b$ to urge the plug 349 down to the inactive position. The controlled lock-up clutch oil in line 395 is connected to the closed end of the large bore 394 to act up on the free end of land $b$ of plug 349.

The splitter high clutch pressure in line 170 acts on the land $c$ of regulator valve 343 to oppose spring 367 and lower the regulated main line (340) pressure and on both sides of land $d$ through communicating orifice 344 to damp the action of the splitter high pressure on the regulator valve 343 and movement of the regulator valve 343.

The brake outlet pressure in line 181 acts upon the lower end face of plug 347 to oppose the spring 367 and reduce the regulated pressure. As pointed out above, the brake pressure simultaneously acts on the larger area of land 343a and the smaller area of plug 347 to provide a net increase of main line pressure. The differential arrangement reduces the effect of high brake pressure on valve 343 without employing an extremely small valve plug. The governor controlled lock-up clutch pressure in feed line 395 acts up on the lower face of plug 349 against the spring 367 to reduce line pressure. Thus each of these pressures acts against the spring 367 and to lower main line pressure. Since the plugs are arranged in series, the effective force on the regulator valve 343 to move it toward the open position against the spring 367 will only be as large as the largest of these three fluid forces acting on their respective plugs. The intermediate clutch pressure in line 250 acts on the plug 349 with the spring 367 but is only effective to oppose the pressure in feed line 395 acting upon plug 349 to partially reduce the effect of this pressure so that the governor controlled lock-up pressure will not reduce the regulated line pressure as much in intermediate ratio as in other ratios.

Throttle Valve Unit

The throttle valve unit 401 (FIG. 6) supplies a throttle pressure and a downshift pressure responsive to the throttle pedal position to control the shift valves. The throttle valve unit 401 is located in bore 402 in the valve body and includes a throttle regulator valve 403 and a downshift valve 411. When the engine fuel feed control, such as a throttle pedal, is in the closed position, the valve unit 401 is in the closed position illustrated. Then the throttle valve 403 having lands a and b is located in the bore 402 so that the upper land 403a blocks flow of oil from the main line 340 via main line port 404 to the bore 402, but port 404 provides an annular passage around the land 403a and always connects the main line 340 to the lock-up cut-off valve unit 465. When the valve is in the closed position the land b is located below throttle port 406 and exhaust port 407 and the space between the lands connects the throttle line port 406 to exhaust port 407 to exhaust the throttle pressure in line 408. The throttle line 408 is also connected to the port 409 adjacent the closed end of the bore 402 so that the throttle pressure acts down on land a.

The downshift valve 411 has lands a and b of equal diameter spaced from one another and located in the bore 402 and a land c of larger diameter at the other end spaced from land b that enters in bore 423. The throttle valve unit 401 is controlled by the accelerator pedal (not shown) which is connected by a linkage including lever 414 which engages the end face of land c to move the downshift valve 411 into the bore 402 and increase the pressure exerted through spring 415 on the throttle regulator valve 403. Valves 403 and 411 have extensions projected within the coil spring 415 which provide a locating device for the coil spring and a stop means to prevent the spring being compressed beyond its elastic limit. The throttle line 408 is also connected to port 416 which is normally closed by the land a of valve 411 when the throttle pedal is in the closed or an intermediate position. When the valve 411 reaches the downshift position which may be at high throttle, full throttle or just beyond full throttle position, the space between the lands a and b connects throttle pressure line 408 via port 416 to port 417 which connects throttle pressure, now at a maximum but less than line pressure, to the downshift line 418. The port 417 is also connected through an orifice 419 to an exhaust port 421. The orifice is small so that when the regulated line pressure is open to line 418, the pressure is not materially reduced and downshifts the shift valves. However, when the detent line 418 is closed by the land a of valve 411, the trapped oil will drain through orifice 419 to exhaust 421 to prevent oil locked in line 418 interfering with the action of the shift valves. At the same time or just before the throttle pressure line 408 is connected to the downshift line 418, the port 422 connected to throttle line 408, now at line pressure is open to the space between lands b and c and the oil tends to flow into the large open end portion 423 of bore 402 and, substantially simultaneously, the large land c of downshift valve 411 enters bore 423 to provide a fluid detent action. It will thus be seen that further movement of the valve 411 requires an additional force to overcome the force of the pressure in throttle line 408 acting on the unbalanced area between the lands b and c of valve 411. Thus the operator will be required to exert an extra force on the throttle pedal to energize the downshift valve 418 to effect a downshift. The shoulder 429 on land c limits movement of the valve 411. The throttle valve unit 401 provides throttle pressure in line 408 directly proportional to the throttle pedal position and a downshift pressure in line 418 effective at a certain point of throttle movement such as high or full throttle or slightly beyond full throttle to effect a downshift.

Speed Governors

The transmission control system employs three governor pressures, the front governor pressure, proportional to the speed of the splitter gear unit output or connecting shaft 33, and the rear governor and the rear pump pressures, proportional to the speed of the transmission output shaft 69 which is proportional to vehicle speed. The shaft 33 drives the front Pitot governor 51 (FIG. 1) to provide a governor pressure in line 220 proportional to the speed of shaft 33. The rear Pitot governor 86 has a trough 311 driven by the output shaft 69 and provides a pressure in line 320 proportional to the output shaft speed. As indicated above, the rear pump 321 and orifice 331 (FIG. 7) provide in line 329 a pressure proportional to output shaft speed. These governor pressures and the above-described throttle pressure and downshift pressure are employed to control the automatic shift valves to provide automatic speed ratio changes.

Manual Valve

The operator positions the manual valve unit 427, FIG. 6, to select the range Reverse, R, Neutral, N, Drive, D, Fifth Gear Hold, 5, Intermediate, Int, or Low, Lo, in which the transmission may be automatically controlled. The oil in main line 340 flows through orifice 424 or the lock-up cut-off valve unit 465 (FIG. 6), as explained below, depending on the position of the lock-up cut-off valve unit, to the ratio change line 425 which is connected to the bore 426 of manual valve unit 427. The valve 428 is slidably mounted in the bore 426 and has land 428a at the top end and land 428b at the center and an aperture 431 at the other end to connect the valve to the manual control linkage. With the valve in the neutral position illustrated, the controlled main line 425 enters the bore 426 and is connected between lands a and b to drive signal line 435. Upward movement of the valve 428 to the reverse position R will connect line 425 to reverse line 310. Movement of the valve 428 downwardly to the drive range position D connects the controlled main line 425 via the space between the lands a and b to the drive range line 432 and drive signal line 435 which prevents disabling the splitter shift valve unit 490. In fifth gear hold position (5) main line 340 remains connected to drive range line 432 but is disconnected from drive signal line 435 to permit high ratio line 210 to disable the splitter shift valve 490 to hold the transmission in fifth ratio as explained below in connection with the splitter shift valve unit 490. Further movement of the valve 428 to the intermediate range position INT will similarly connect the control line 425 to both the drive range line 432 and the intermediate range line 433 and movement of the valve to the low position LO will connect controlled line 425 to the drive range line 432, the intermediate range line 433 and the low range line 434. When the valve 428 is in the neutral position, it will be seen that the reverse line 310 is connected to exhaust through the adjacent end opening 436 of the bore 426 to reverse exhaust valve 438, and the lines 432, 433 and 434 for the various drive ranges are connected to a free exhaust at the adjacent end opening 437 of the bore 426.

The reverse exhaust valve 438 maintains a very low pressure just to fill reverse clutch line 310 and motor 83. Leakage is replaced through reverse make-up line 439 and orifice 440 which connects the regulated line 340 with reverse line 310. The orifice 440 limits the flow to the approximate quantity to make up for leakage in the reverse clutch motor.

When the valve 428 is in the drive range position, the intermediate range line 433 and the low range line 434 are connected to exhaust 437 and, in the intermediate position, low range line 434 is connected to exhaust 437. The valve 428 between the lands 428a and b has a series of annular grooves 441, one for each valve position, which cooperate with the spring-loaded ball detents 442 to resiliently hold the valve in the selected range positions.

Lockup Valve Unit

The lock-up valve unit 445 (FIG. 5) automatically controls the lock-up clutch 16 and the converter pressure. The main line 340 is connected through the dual check valve 333 to the lock-up valve unit 445. The lock-up valve 446 has an end land a, a central land b having the same diameter slidably mounted in a bore 447 in the valve body, and a land c adjacent the other end of smaller diameter which fits in a smaller diameter bore portion 448. The valve 446 has a stud 451 extending above land a which serves to limit the upward or opening movement of the valve 446 and locate spring 452 in the spring chamber 453. The spring 452 engages the end of chamber 453 and the valve to resiliently urge the valve 446 in a closing direction. The throttle pressure and forced downshift pressure are connected by the downshift line 418 to the spring chamber 453 to act on the free end of land 446a and close valve 446 to disengage the lock-up clutch. The front governor pressure in line 220 acts on the lower face of the lock-up plug 455 located in an enlarged portion 456 of the bore 447 to move valve 446 toward open position. When the valve is in the closed position, illustrated in FIG. 5, the land b blocks the main line 340 and the governor controlled lock-up feed line 395 is connected between the unbalanced lands b and c to the exhaust 457. Exhaust 458 provides a drain between valve 446 and plug 455 to prevent the accumulation of oil under pressure due to leakage. The secondary line 356 is connected between the lands a and b when the valve 446 is in the closed position to the converter inlet line 100. Thus when the converter is functioning and full regulated main line pressure is supplied to the secondary line 356, this pressure is connected to the converter inlet line 100. Due to the normal flow of oil in line 100 through the converter and cooler 711, the pressure in converter inlet line 100 is lower than main and secondary line pressure as controlled by the pressure control unit 341. However if flow in line 100 is restricted for example, by cold oil in the cooler 711, the converter charging pressure could rise to main line pressure which is too high. The converter pressure regulator valve 462 limits the converter charging pressure in line 100 at a value between normal converter charging pressure and main line pressure to prevent an excessive converter charging pressure.

The lock-up valve 446 is controlled by spring 452 and the throttle pressure in line 408 acting via downshift line 418 to close the valve against the front governor pressure in line 220 acting to open the valve. When the governor pressure increases sufficiently due to the increase in the intermediate shaft speed to overcome the spring force and the throttle pressure, the valve 446 moves and land b uncovers the main line 340 and permits oil under pressure to flow between lands 446b and c to act on the unbalanced area of lands b and c to tend to hold the valve 446 open to prevent hunting and to provide a hysteresis loss so that a downshift will only occur at a lower speed. With valve 446 in the open position, the main line 340 is connected to the lock-up clutch feed line 395 and to the lock-up cut-off valve 465 which connects to the lock-up clutch line 90 except during a shift as explained below. At this time the land c closes exhaust port 457.

If desired the lock-up valve 446 may be controlled by the spring 452 acting against the front governor pressure by disconnecting the downshift line 418 from the lock-up valve unit 445 and connecting spring chamber 453 to exhaust.

Since the converter 4 is inoperative when the lock-up clutch 16 is engaged, except during brief shift intervals, the lock-up valve is used to reduce the converter pressure when valve 446 is opened to engage lock-up clutch 16. When the lock-up valve 446 is opened, the land b closes the converter inlet line 100, and stops the flow of the oil from the secondary line 356 to the converter inlet line 100. The pressure in the converter thus drops until it reaches a lower value maintained in the low pressure line 362 by the pressure control unit 341. The exhaust from the regulator valve unit 341 in exhaust 361 is maintained at a controlled low pressure by the relief valve 363 and flows through check valve 461 and low pressure feed line 362 to the converter inlet line 100. Check valve 461 prevents flow from converter feed line 100 to relief valve 363.

The lock-up shift valve 445 will not upshift in reverse, so the lock-up clutch is not engaged in reverse, since the front governor line 220 is connected to exhaust in reverse by check valve 464 (FIG. 4) and drive range line 432 which in reverse range is exhausted at manual valve 427. In all forward ranges line pressure in drive range line 432 closes check valve 525 for normal operation of the lock-up shift valve 445.

Lock-Up Cut-Off Valve Unit

The lock-up cut-off valve unit 465 (FIG. 6) which disengages the lock-up clutch 16 during each ratio change interval includes a valve 466 having lands a and b located in a bore 467 of uniform diameter. With the valve in the normally open position, as illustrated, the controlled lock-up feed line 395 and the lock-up clutch line 90 are connected by the space between the lands a and b. The exhaust port 468 for the lock-up clutch line 90 is blocked by the land 466a. A spring 471 positioned in one end of bore 467 urges the valve 466 to opened position. A pin 472 mounted on the valve body locates and limits the compression of this spring. Main line 340 is connected to the other end of bore 467 and by-pass passage 476 of the ratio change line 425 is connected opposite land b. The main line oil is connected by line 340 to the bore 467 beneath the valve to act on the free end of land b spaced from the end of the bore by stud 478. The oil flows through orifice 424 when cut-off valve 466 is closed and through by-pass 476 when valve 466 is open to the ratio change line 425 which is connected to supply the manual valve unit 427 and splitter shift valve 490 (FIG. 4) and to control the lock-up cut-off valve 466. Line 425 is connected, to control valve 466, to the bore 467 through an orifice 481.

The lock-up cut-off valve unit 465 in its normal position is open to permit flow from the lock-up valve unit 445 and controlled lock-up feed line 395 to the lock-up clutch line 90 and clutch 16 due to the action of spring 471 and the balanced opposing pressures in main line 340 and ratio change line 425 on the end faces of valve 466. Whenever the oil flows through ratio change line 425 to effect a change in ratio by filling one of the ratio motors, oil flows from the main line 340 through the orifice 424 creating a pressure difference between the oil in the main line 340 acting on the end face of land *b* and the oil in ratio change line 425 which acts on the end face of land 466*a*. The higher pressure in line 340 raises valve 466 against spring 471 and connects lock-up clutch line 90 to exhaust 468 and blocks controlled feed line 395. An excessive difference in pressure between main line 340 and ratio change line 425 will raise valve 466 against spring 471 further to connect these lines momentarily via the by-pass 476 to reduce the pressure differential. Thus the normal main line pressure applied to the ratio clutch motors is reduced during each shift interval until the ratio motor is substantially filled and rapid flow stops. The point of engagement of the ratio clutch motor at which the pressure is increased and the lock-up clutch engaged, is controlled by the force of spring 471. As the flow slows down, the pressure differential is reduced and at a certain low pressure differential spring 471 closes the valve 466. The flow of oil between line 425 to the spring chamber is restricted by orifice 481 to damp valve movement. When the lock-up valve unit 445 opens, the lock-up cut-off valve unit 465 will be in the normally open position illustrated to engage the lock-up clutch 16 but will close during each ratio change interval to disengage the lock-up clutch 70. The lock-up clutch may be released at the will of the operator by opening the valve 483 which may be solenoid operated to connect the spring chamber end of bore 467 directly to exhaust 484.

*Splitter Valve Unit*

The splitter valve unit 490 (FIG. 4) automatically shifts to control the ratio of splitter gear unit 27 by actuating the splitter high clutch 48 to provide direct drive or by actuating the splitter low ratio engaging device 36 to provide underdrive. The governor forces acting on the valve unit 490 are changed to shift the splitter unit at three different vehicle speeds depending on the ratio engaged in the three-speed unit 46, the first when in low ratio, the second when in intermediate ratio and the third when in high ratio in the three ratio unit 46 to provide six drive ratios.

The splitter shift valve 491, located in bore 492—494, has lands *a*, *b*, *c* and *d* with intermediate spaces of lesser diameter. Lands *a* and *b* having an equal larger diameter fit in upper large bore 492 while lands *c* and *d* having an equal smaller diameter fit the lower small diameter bore 494. With the splitter valve 491 in the low position illustrated in FIG. 4, the ratio change line 425, which is regulated by regulator unit 341 and shift controlled by lock-up cut-off valve unit 465, is connected to the valve bore 492 between the lands *a* and *b*. The line 425 is thus connected between the lands *a* and *b* to the splitter underdrive line 150. The controlled exhaust line 493 connected to the bore 492 opposite land *a* is blocked. The throttle pressure in line 408 enters the bore 492 via a port immediately adjacent the free end face of land *a* of valve 491 in the downshift position and acts on the valve 491 to hold it in this position. The downshift pressure in line 418 enters the bore 492 adjacent the end wall 496 and acts at all times upon the free end face of land *a* of valve 491 to move it to low position. The splitter control plug 497 having lands *a* and *b* is located in bores 498 and 499 respectively coaxially located with respect to bore 492. Land *a* of plug 497 closes the bore 499 at all times and at times acts on land *a* of valve 491. A spring 502 seated on piston 501 in stepped bore 500 biases plug 497 to engage the valve 491 to urge it to low position. The rear pump line 329 enters the bore 498 beneath land *a* of plug 497 to lift the plug 497 and eliminate the effect of spring 502 on the operation of valve 491. The shoulder 503 limits upward movement of the plug 497 and splitter valve 491. Thus the spring 502, unless made ineffective by pressure from the rear pump line 329, the throttle pressure from line 408 and the downshift pressure from line 418, tends to urge the splitter valve 491 down from high to low position.

In reverse, neutral and drive range positions of the manual valve unit 427 fluid is supplied via the drive signal line 435 to the closed end of bore 500 to move piston 501 down to the vented position. The movement is limited by the shoulders on the stepped piston 501 and bore 500 to a small degree that does not materially change the spring force on the plug 497. Then movement of piston 501 to the vent position thus does not materially affect the operation of the splitter shift valve unit 490 in reverse and neutral. Since fluid is not supplied by signal line 435 in low, intermediate, and fifth gear hold range, the piston 501 remains in the upper or closed position shown but is effective only in fifth gear hold when fluid is supplied to the high ratio line 210 via port 504 in piston 501 to the closed bores 498—500 to act on plug 497 to hold the splitter shift valve unit 490 in the downshift position. In drive range fluid supplied via line 435 moves piston 501 down aligning port 504 and exhaust 505 to vent bores 498—500 to permit normal operation of valve unit 490.

With the valve 491 in the low position shown, the direct drive clutch line 170 located between large bore 492 and small bore 494 is connected between the lands *b* and *c* to exhaust port 506. The feed line 511 supplied by a suitable source A of fluid under pressure is blocked by land *c* of valve 491. The splitter low exhaust feed line 512 is connected by the space between the lands *c* and *d* to the exhaust port 513.

With the valve in the upper or high position, the main line 425 is connected between lands *b* and *c* to the high ratio line 170 and the low ratio line 150 is connected to controlled exhaust line 493 and the feed line 511 is connected to the splitter low exhaust feed line 512 to effect control of the splitter low exhaust valve 650 which is described below.

Since the splitter valve 491 shifts the splitter gear unit 27 between low and high ratio when the three-speed gear unit is in each of the three ratios, low, intermediate and high, combinations of the three governor pressures, front governor pressure (line 220), rear governor pressure (line 320), and rear pump pressure (line 329) provide three separate shift points. With valve 491 in low position illustrated in FIG. 4, the relay controlled rear pump line 517 enters the bore 494 between land *d* of valve 491 and the front governor splitter plug 518 which is located in bore 494 and engages land *d*. A low intermediate valve controlled front governor line 521 is connected to the valve bore 494 at the partition 516 having an aperture smaller than bore 494 and between front governor plug 518 and rear governor plug 522. A rear governor splitter plug 522 is positioned in the large bore 523 located coaxially with respect to the bore 494. Plug 522 has a stem 524 having a diameter slightly smaller than plug 518 extending through the aperture in wall 516 to engage the lower face of front governor plug 518. The intermediate high controlled rear governor pressure in line 526 enters the bore 523 between the partition 516 and the plug 522 to urge the plug 522 down away from valve 491. The rear governor pressure in line 320 enters the end of the bore 523 via orifice 527 to act on the end face of plug 522 to urge the plug 522 and valve 491 up to high drive position. The rear governor pressure in line 320 acting on the lower face of plug 522 when the three ratio unit is in high and intermediate is opposed by the intermediate high controlled rear governor pressure in line 526 acting on the smaller upper face of rear governor plug 522 to provide a reduced governor force in intermediate ratio. The low intermediate controlled front governor pressure in line 521 acts in low range between the front governor plug 518 and the rear governor plug stem 524 to urge the valve 491 to direct drive position and hold stem 524 and plug 522 down. The intermediate high controlled rear pump pressure in line 517 acts, when an upshift or downshift between low and intermediate range is initiated, between land *d* of valve 491 and front governor plug 518 to urge the valve 491 up toward direct drive position and hold plugs 518 and 522 down.

The rear governor line 320 between the orifice 527 and the splitter valve unit 490 has a branch 528 connected to the operating chamber of accumulator 529. The accumulator spring is sufficiently strong so the accumulator is not charged until after the third fourth ratio shift of the splitter shift valve. Thus, the accumulator does not affect upshifts. After the fourth fifth ratio upshift since rear governor pressure is high and since intermediate line 250 is exhausted governor pressure charges the accumulator. The accumulator is discharged when intermediate ratio is engaged since intermediate ratio line 250 is connected by branch 250′ to the spring chamber of the accumulator. The discharge of the accumulator holds the splitter shift valve in the upshift position to insure a 5–4 or 6–4 ratio shift except unusual conditions.

These three governor forces tending to move the valve 491 from low to high position are opposed by spring 502, until disabled by rear pump pressure, and throttle and downshift pressures tending to return the valve to low position. When valve 491 is in high position, the main line pressure acting via ratio change line 425 on the unbalanced area of lands 491*b* and *c* provides the hysteresis action by tending to hold the valve in high position.

Low Intermediate Valve Unit

The low intermediate shift valve unit 530 is hydraulically controlled by manual valve unit 427 to shift the three-ratio unit between low and intermediate ratio and to condition the splitter valve unit 490 to shift at the first or second shift point. This unit 530 consists of a splitter relay valve 531 located in a large bore 532 which to conveniently provide a low pressure oil supply is located beneath the sump oil level and low intermediate shift valve 533 located in a smaller diameter bore 534.

The relay valve 531 has lands *a*, *b*, and *c* of equal diameter with intermediate spaced portions of reduced diameter providing flow spaces. In the intermediate and drive range position shown in FIG. 4, spring 536 located at the end of bore 532 holds the valve 531 on a shoulder 537 between the bore 532 and the bore 534. The low range line 434 is connected to bore 532 at the shoulder 537 and the oil acts on the end of land *c* of valve 531 to raise it against the spring 536 to the low range position where land *a* abuts stop pin 538. With relay valve 531 in the drive or intermediate range, as shown, the rear pump feed line 329 is connected to the bore 532 between the lands *b* and *c* adjacent the land *b*. The relay valve controlled rear pump line 517 is connected between the lands *a* and *b*. A free exhaust port 541 is connected to the bore 532 between the lands *a* and *b*. Immediately above land *a* of valve 531, there is a free exhaust port 542 for bore 532. The end portion of the bore 532 is enlarged to provide a spring chamber 543 connected to exhaust passage 546 having a one-way check valve 547 and an orifice 548 extending to a point under the oil level in the sump to keep the chamber full of oil to cushion valve movement.

With relay valve 531 in the intermediate and high range position shown, the rear pump line 329 is blocked between lands 531*b* and *c*, controlled rear pump line 517 is connected between lands 531*a* and *b* to exhaust 541 and spring chamber 543 is filled with oil. When the manual valve 427 is moved to low range, oil in line 434 tends to move relay valve 531 up. The first increment of movement, while free exhaust 542 is open, is fast and connects rear pump line 329 to controlled rear pump line 517. After land *a* closes exhaust 542, the oil in spring chamber, being retained by check valve 547, slows the valve 531 and only permits very slow movement due to slow leakage of oil past land 531*a* to exhaust 542. During this slow movement, the rear pump pressure in line 517 prevents a downshift of splitter valve unit 490. When land 531*a* enters the spring chamber and permits flow to exhaust 542, the valve 531 is substantially in low range position engaging stop 538, land *c* blocks rear pump line 329, and controlled rear pump line 517 is connected to exhaust 541 permitting normal downshift of splitter valve unit 490.

When the manual valve unit 427 is shifted from low range, low range line 434 is exhausted, spring 536 returns valve 531 and draws oil from the sump through exhaust line 546, orifice 548, and check valve 547 to replenish the oil in spring chamber 543. Though the return movement is faster, since orifice 548 permits a greater flow than the clearance at land 531*a*, rear pump pressure from line 329 is momentarily supplied to controlled rear pump line 517 to momentarily inhibit a downshift of the splitter valve unit 490 during the shift interval. When valve 531 reaches the intermediate and high range position shown, the rear pump line 329 is again blocked and line 517 connected to exhaust 541.

The low intermediate shift valve 533 located in bore 534 has lands *a*, *b*, *c* and *d* of equal diameter and intermediate portions of reduced diameter to provide intermediate flow spaces. The land *d* has a shoulder 551 which engages the valve body at the end of bore 534 and limits upward valve movement under the influence of the spring 552 in the intermediate high position, shown in FIG. 4, preventing contact with valve 531. The spring 552 seated in a larger diameter coaxial spring chamber 553 engages the valve 533 to urge the valve up. A stop 554 in chamber 553 limits downward movement of valve 533 in the low position. Spring chamber 553 has an exhaust port 556 to prevent fluid accumulating and blocking movement of the valve in the chamber.

When the low intermediate shift valve 533 is in the intermediate high position shown, the low exhaust port 557 located between the lands 533*a* and *b* is connected through low pressure relief valve 558 to sump to maintain a low pressure in exhaust port 557 and low ratio line 270. The low make-up line 560 having an orifice 562 connects the controlled main line 425 to the exhaust port 557 to supply fluid lost by leakage to keep the exhaust port 557 and connected low ratio line 270 and the low ratio motor filled. The low ratio line 270 is connected to the space between lands *a* and *b*. The drive range supply line 432 supplies controlled and regulated main line pressure to the bore 534 between the lands *b* and *c*. The intermediate high supply line 559 is connected to the bore 534 between the lands *b* and *c*. An exhaust port 561 located between the land *c* and *d* is connected to sump through exhaust line 310 on low pressure relief valve 438. The controlled front governor line 521 is connected to bore 534 between lands *c* and *d*. The front governor line 220 is connected to bore 534 opposite land *d*.

With the low intermediate shift valve 533 in the intermediate and high range position illustrated in FIG. 4, the drive range line 432 is connected between lands *b* and *c* to the intermediate high shift valve supply line 559. The low make-up line 560 connects the controlled main line 425 through orifice 562 to port 557 to replenish leakage and low relief valve 558 maintains a low pressure in exhaust port 557. The low ratio line 270 is connected between lands *a* and *b* to the low pressure exhaust port 557 which maintains low pressure oil in low clutch line 270 to keep the low motor filled. The controlled front governor line 521 is connected between lands *c* and *d* by port 561 and line 310 to exhaust at low pressure relief valve 438.

When pressure in the low range line 434 acts between land *c* on valve 531 and land *a* on valve 533, to separate the valves, the relay valve 531 moves up as explained above and the valve 533 moves down to the low range position where the drive range line 432 is connected between the lands *a* and *b* to the low ratio line 270 and low exhaust 557 is blocked by land *a*. The intermediate high supply line 559 is connected by the space between the lands *b* and *c* to exhaust through port 561. The front governor line 220 is connected between the lands *c* and *d* to the controlled front governor line 521 to provide front governor pressure on splitter plug 518 for a first to second ratio shift in low range when the three ratio unit 46 is in low.

*Intermediate High Shift Valve Unit*

The intermediate high shift valve unit 570 (FIG. 3) automatically controls the intermediate high shift and one of the governor pressures acting on the splitter valve 490. The intermediate high shift valve 572 located in bore 571 has large diameter lands *a* and *b* located in a large bore portion 573 and small diameter lands *c*, *d* and *e* located in a small bore portion 574 and intermediate portions of smaller diameter between the lands. At the upper end of the bore 571, the wall 581 has a smaller diameter bore for the stem 582 of the intermediate high blocker plug 583 which has stepped lands *a* and *b* with the small land *a* adjacent the stem 582 fitting in the intermediate size coaxial bore 586 and a second land *b* at the end located in the large coaxial bore 587. Spring 591 engages the end wall of bore 587 and the upper face of land *b* of plug 583 to urge the blocker plug 583 and shift valve 572 toward the intermediate position. A stud 592 fixed on the end wall of bore 587 limits upward movement, in the high position of valve unit 570. The intermediate range line 433 energized by manual valve unit 427 is connected to bore 587 near the end wall. At the shoulder between the bores 587 and 586, there is an exhaust port 594 to drain leakage oil. The rear governor line 320 is connected by port 593 to the bore 586 adjacent the wall 581 so that rear governor oil acts on the face of land *a* adjacent the stem 582 to move plug 583 up against spring 591. The downshift pressure supplied by the throttle valve unit 401 is connected by downshift line 418 to bore 573 adjacent wall 581 and acts to raise the stem 582 and plug 583 and to act on the end face of the land *a* of valve 572 to move the valve down toward intermediate position. The throttle pressure in line 408 enters bore 573 just above the land *a* of valve 572 and tends to move the valve 572 down toward intermediate position and to move the plug 583 away from the valve 572. On upshift of the valve 572 to the high position, the land *a* will close the port of throttle line 408.

With valve 572 in the intermediate position illustrated in FIG. 3 the intermediate ratio clutch is engaged, and the controlled intermediate exhaust line 601 is blocked by land *a*. The intermediate clutch line 250 is connected to the bore 573 between the lands *a* and *b* adjacent land *a* of the valve 572. The intermediate high supply line 559 is connected to the bore 573 between the lands *a* and *b* adjacent land *b*. The high clutch line 210 is connected to the bore 573 between the lands *b* and *c* adjacent land *b*. Exhaust port 602 is connected to the bore 574 between the lands *b* and *c* adjacent land *c*. The rear governor line 320 is connected to a port 603 which is blocked by the land *c*. The controlled rear governor line 526 is connected to the bore 574 between land *c* and *d* adjacent the land *c*. An exhaust port 607 is connected to the bore 574 between land *c* and *d* adjacent land *d*. The limited feed line 511 is blocked by the land *d*. The intermediate exhaust feed line 608 is connected to the bore 574 between lands *d* and *e* adjacent land *d*. An exhaust port 611 is located between lands *d* and *e* adjacent land *e*. An exhaust port 612 is located adjacent the end face of the land *e* of valve 572.

At the end of shift valve 572, bore 571 has a large portion 614 for the intermediate high plug 616 which engages land *e* of valve 572 and stem 621. A port 617 in bore 614 adjacent the end wall 618 is connected to the rear governor line 320 so that the rear governor pressure acts on the lower face of plug 616 to urge the valve 572 up to high position. A transfer stem 621 extends through an aperture in wall 618 to a larger bore 622 located coaxially with respect to the main bore 571. The intermediate high accelerator plug 624 is located in bore 622 and acts through the stem 621 and the governor plug 616 on valve 572 to raise it toward high position. The controlled intermediate exhaust in line 601 is connected by port 626 to the lower end of bore 622 to act on the free end face of plug 624 to tend to move the valve assembly toward high position. Bore 622 between plug 624 and wall 618 is drained by exhaust 627.

The intermediate high shift valve 572 is urged to the intermediate position illustrated in FIG. 3 by the spring 591 acting through the intermediate high blocker plug 583 unless rear governor pressure in line 320 lifts the plug to disable the spring, by the pressure in intermediate range line 433 on plug 583 which is effective in intermediate and low ranges regardless of rear governor pressure, and by downshift pressure in line 418 and throttle pressure in line 408 acting on end face of land 572*a*. If one or more of these downshift forces overcome the upshift forces, valve 572 is in the intermediate position and the intermediate high supply line 559 is connected between lands *a* and *b* to intermediate clutch line 250. The high clutch line 210 is connected between lands *b* and *c* to exhaust 602. Rear governor line 320 is blocked by land *c* and controlled rear governor line 526 is connected between lands *c* and *d* to exhaust 607. The limited control feed line 511 is blocked by land *d* and the intermediate exhaust feed line 608 is vented between lands *d* and *e* to exhaust 611.

In high range when intermediate range line 433 is exhausted, the valve 572 is conditioned by governor line 320 supplying oil under pressure to port 593 to raise blocker plug 583 and spring 591 out of engagement with valve 572 to provide a rateless valve. The rear governor pressure at port 617 then acts on the outer end of governor plug 616 against throttle pressure acting on land *a* to upshift valve 572. When valve 572 is upshifted to high position, the intermediate clutch line 250 is connected between lands *a* and *b* to the controlled intermediate exhaust line 601 which is also connected below the accelerator plug 624 to urge valve 572 to high position during the controlled intermediate exhaust period to provide hysteresis before the high clutch pressure has built up sufficiently to provide hysteresis on the unbalanced area of the shift valve. The intermediate high supply line 559 is connected between unbalanced lands *b* and *c* providing hysteresis to high clutch line 210 to engage the high clutch. Rear governor line 320 is connected via port 603 between lands *c* and *d* to the controlled rear governor line 526. The limited controlled feed line 511 is connected between lands *d* and *e* to the intermediate exhaust feed line 608 and exhaust 607 and 611 are blocked by lands *d* and *e*.

*Downshift Timing Valve*

Referring to the top of FIG. 4, the downshift timing valve unit 630, which controls the engagement of the intermediate clutch has a valve member 631 with lands *a* and *b* of equal diameter connected by an intermediate portion of reduced diameter to provide a flow space and an end land *c* of smaller diameter located in a stepped bore 632. Spring 635 located in the vented end of bore 632 normally holds valve 631 in the closed position shown. Throttle oil in line 408 is connected to the bore 632 to act on the end face of land *b* and low clutch oil in line 270 is connected through an orifice to bore 632 to act on the end face of land *c* to open the valve 631. The valve 631 normally closed by spring 635 and opened only by both low clutch pressure and throttle pressure between one-half and wide open throttle. The portion of the intermediate clutch line 250 from the intermediate shift valve unit 570 is connected to the port 633 and the other portion of the intermediate clutch line 250 leading to the clutch motor 62 is connected to port 634. With the valve 631 in the open position ports 633 and 634 are connected between lands *a* and *b* to freely connect the two portions of line 250. With the valve member 631 in the closed position shown, the land *c* engages the end of the bore to limit movement, and land *a* will block port 633 to cause the oil to flow through the orifice 636 connecting the two portions of line 250 to provide a slow feed for the intermediate clutch motor.

The valve 631 will be in open position when the oil in the low clutch line 270 applies low ratio clutch and the throttle is open, preferably one-half or more, there will be free flow through the valve 631 and line 250 permitting a quick application of the intermediate clutch on a high throttle shift from low. When either the low clutch line is exhausted or throttle pressure is low, preferably below half throttle, the valve is closed to block port 633, the oil flows through the restricting orifice 636 in line 250 to effect a slow application of the intermediate clutch. Thus on a low throttle upshift from low to intermediate, and on all downshifts from high to intermediate, the intermediate clutch is slowly applied through restricting orifice 636.

Trimmer Valve Unit 640

The trimmer valve unit 640 regulates the pressure in the ratio change line 425 from an initial low value to a final value equal to main line pressure at gradually increasing values during the engagement of all of the ratio engaging devices. This unit does not regulate the pressure supplied to the lock-up clutch by line 90. The trimmer unit has a trimmer valve 641 and a trimmer plug 644 located in a closed bore 642. A spring 643 located between the one end of the bore 642 and the plug 644 biases the plug and valve to the other end. The stop 645 limits movement of the plug toward the one end of the bore and excessive compression of the spring 643. The valve member 641 has a central cavity 646 in which a spring 647 is located to provide a small separating force between the plug 644 and valve 641.

The trimmer valve unit 640 is in the normal position shown in FIG. 7 when main line pressure is supplied by the lock-up shift valve 445 and the lock-up cut-off valve 465 to line 90. When the pressure in the ratio change line 425 is reduced due to the flow from main line 340 through the orifice 424 at the lock-up clutch cut-off valve 465, FIG. 6, to initially fill a ratio change line 425 to initially fill a ratio change motor, the pressure differential across orifice 424 actuates the lock-up cut-off valve to cut off the supply of pressure from the lock-up shift valve 445 via line 395 to the lock-up clutch line 90 and exhausts lock-up clutch line 90.

When line 90 is exhausted to disengage the lock-up clutch 16 the end of the bore at spring 643 is exhausted to condition the trimmer unit for operation. The reduced pressure in line 425 is connected to the other end of the bore 642 and acts to move the valve 641 and plug 644 as a unit against the biasing force of spring 643 just enough to permit the escape of fluid via exhaust 648 to regulate the pressure at an initial low value. At the same time the fluid from line 425 passes through the orifice 649 into the substantially filled chamber 646 between the valve 641 and plug 644 and increases the pressure in the chamber to a value almost equal to the pressure in line 425 to permit the spring 647 to begin to separate the valve and plug and increase the effective biasing force of spring 643. The biasing force of the spring 643 is increased since the separation of the valve and plug increases the length of the unit so that the spring operates progressively in a more compressed condition providing an increasing biasing force. The size of the orifice 649 will determine the rate of separation of the valve and plug and thus the rate of increase of the pressure in the ratio engaging devices supplied by the line 425. As the pressure in line 425 continues to rise due to the separation of the valve 641 and plug 644, the plug will engage the stop 645 at substantially the maximum pressure regulated by valve unit 640. Then the pressure in chamber 646 plus the force of spring 647 will move the valve 641 to close the exhaust. The spring 647 provides a small force so that the valve 641 closes when the plug abuts the stop and the pressure in the chamber 646 reaches a value slightly below the lowest regulated pressure in line 425. This value is selected at a value lower than the lowest main line pressure but sufficient to fully engage the ratio engaging devices on the gradual portion of the pressure rise curve. Then the pressure in line 425 quickly rises to main line pressure.

It will be appreciated that as long as the pressure in line 425 is being regulated and thus exhausted at exhaust 648 that there will be a pressure drop from the orifice 424 holding the lock-up cut-off valve unit 465 in closed position. As soon as valve 641 closes, the ratio engaging device having been filled and engaged during the gradual pressure rise, the pressure will equalize in lines 340 and 425 permitting the valve unit 465 to open to re-engage the lock-up clutch.

When the valve 641 closes the ratio engaging motor having been filled flow in line 425 ceases and thus the lock-up cut-off valve 465 opens to supply fluid from line 395 to line 90 to engage the lock-up clutch. When this occurs the line 90 also being connected to the other end of the valve bore at spring 643 balances the pressure from line 425 at the other end of the bore and the spring 643 moves the plug 644 against the valve element 641 ejecting the fluid between the plug and valve via orifice 649.

It may also be desirable for some ratios requiring fast engagement to disable the trimmer valve unit 640. This is done, for example, in connection with the splitter high shift by connecting the splitter high line 170 through check valve 639 to bore 642 between the valve 641 and plug 644 to disable the trimmer valve unit 640. The check valve 639 prevents flow from chamber 646 during normal operation of the trimmer valve unit during engagement of other ratios. The slots 638 insure that line 170 is, when the valve 641 is in the closed position, open to chamber 646.

Exhaust Valve Units

The splitter low exhaust valve unit 650 (FIG. 7) provides overlap in the splitter gear upshift and consists of a splitter low exhaust valve 651 having a land *a* of large diameter located in a large bore portion 652, a small land *b* located in the small diameter bore portion 653 and a smaller intermediate portion providing a flow space. The spring 654 is located in the end of bore 652 and the throttle line 408 is connected to the end of bore 652 so that both the spring 654 and the throttle pressure always urge the valve down toward the exhaust pressure increasing position. With the valve in the neutral or balanced position shown, the exhaust port 657 is just closed by the land *a* and the splitter low exhaust feed line is closed by the land *b*. The exhaust from the splitter low servo, via clutch line 150, splitter low valve unit 490, and splitter low exhaust line 493 is connected to orifice exhaust 655 and to the valve bore between the large and small bores 652 and 653 and enters the space between the lands *a* and *b* of valve 651 to act upon the unbalanced area of land *a* to oppose the force of the spring 654 and throttle pressure. The orifice exhaust 655 permits release of splitter low even if the valve 651 sticks at a rate about equal or slightly less than the minimum rate of exhaust provided by valve 651. The splitter low exhaust plug 661 is positioned in large bore 662 coaxially located at the end of bore 653. The remote end of the closed bore 662 is connected to the direct drive clutch line 170 so that the oil in the direct drive clutch servo urges the shift valve upwardly with the exhaust from splitter low clutch line 493 against the spring and throttle pressure toward the pressure decreasing position. The vent port 663 located between the bores 653 and 662 prevents fluid acting on the adjacent faces of valve 651 and plug 661.

The low exhaust valve 651 will remain in the balanced position shown when the forces acting upwardly, the splitter low exhaust acting on the unbalanced area and the direct drive line 170 acting on plug 661, balances the forces acting downwardly, the spring and throttle pressure on land 651a. An increase in the forces acting upwardly or a decrease in the forces acting downwardly will move the valve 651 up to open exhaust port 657 and decrease the pressure in splitter low exhaust line 493 and clutch line 170. A decrease in forces acting up or an increase in forces acting down moves valve 651 down to connect low exhaust feed line 512 to low exhaust line 493 to increase the pressure in splitter low clutch line 170. Under constant throttle conditions for a brief period after the splitter valve unit 490 shifts from low to high drive, the pressure in the splitter low clutch line 170 and splitter low exhaust line 493 is maintained at a reduced value regulated by the throttle pressure line 408 and spring 654. Since the leakage in the clutch motors and controls of the transmissions vary, a limited amount of make-up oil is available from feed pump A to maintain this reduced pressure if needed because of leakage. Then as the splitter high servo fills and the pressure in the splitter high clutch line 170 builds up, it acts on plug 661 of low exhaust valve 651 to connect line 493 to exhaust 657 to reduce the pressure. An increase in throttle pressure will increase the splitter low controlled exhaust pressure. When the make-up fluid from exhaust feed pump A is exhausted or the lock-up cut-off valve 465 moves to engage the lockup clutch and disable the exhause feed pump A, there is no pressure in splitter low exhause feed line 512 and the low exhause valve unit 650 ceases to regulate.

This valve provides overlap on a low to high shift of the splitter gear by holding splitter low pressure at a reduced or partial value until splitter high pressure increases to engage the splitter high clutch. With increasing throttle the overlap is increased since a higher splitter high pressure is required to exhaust the splitter low clutch.

The intermediate exhaust valve unit 670, which controls the exhaust from the intermediate brake of the three ratio unit, is like low exhaust valve unit 650 and consists of a valve 671 having a large land a located in a large bore 672 and a spaced small land b located in a small diameter bore 673.

Spring 674 which abuts against the end of bore 672 and the throttle pressure connected by line 408 to bore 672 both act on the end face of land a of valve 671 to urge the valve down to the pressure increasing position. The stud 676 secured to free face of land a of the valve 671 limits upward movement of the valve.

With valve 671 in the neutral position as illustrated in FIG. 7, the exhaust port 677 is blocked by the land a. The controlled intermediate exhaust pressure in line 601 is connected to orifice exhaust 675 to the exhaust valve unit 670 at the shoulder between bores 673 and 672 to act on the unbalanced area of lands a and b of valve 671. Orifice exhaust 675 permits disengagement of intermediate ratio if valve 671 sticks. The intermediate exhaust feed line 608 which is supplied through the intermediate shift valve 570 from the limited feed line 511 is connected to bore 673 and blocked by the land b. The intermediate exhaust plug 681 is located in a bore 682 of larger diameter located coaxially with bore 673 and engages land b. The high clutch servo oil in line 210 connected to the end of bore 682 acts upon the end face of plug 681, and the controlled exhaust from line 601 acts on the unbalanced lands, to raise the valve toward the open or pressure decreasing position against the spring 674 and throttle pressure acting down to increase the pressure. An exhaust 683 connected to the bore 682 between the land b of the valve 671 and the plug 681 prevents a pressure build-up due to leakage.

The intermediate exhaust valve unit 670 controls the overlap in the intermediate to high upshift by delaying the exhaust from the intermediate clutch line 250 in the same way as the splitter low exhaust valve unit 650 controls the splitter low clutch line 150. Increasing throttle pressure in line 408 will increase the controlled intermediate exhaust pressure in line 601. When the shift valve unit 570 initiates the intermediate high shift, the intermediate clutch pressure in line 250 is maintained by exhaust control valve unit 670 at a reduced value to provide overlap. Then the increasing high clutch pressure will further decrease the intermediate clutch pressure control overlap and when the high clutch is substantially engaged, exhaust intermediate clutch pressure to terminate overlap. As the throttle pressure increases the reduction of the intermediate clutch oil in lines 250 and 601 will be delayed to provide more overlap.

*Hydrodynamic Brake Control Valve Unit*

The brake control valve unit 690 which controls the action of the hydrodynamic brake, illustrated in FIG. 7, consists of a valve 691 having lands a, b and c of equal diameter separated by portions of smaller diameter to provide flow spaces in bore 692. The spring 693, seated in the closed end of the bore, engages the end face of land a which has a stud 694 which positions the spring and provides a stop to limit movement of the valve 691. The spring chamber portion of bore 692 has an exhaust port 696 adjacent the end. At the other end of bore 692 there is a wall 698 apertured to slidably receive the operating stem 699 which is connected by a suitable linkage to the brake operating mechanism.

With the valve 691 in the brake-off position shown, the secondary line 356 which supplies oil to the brake from the pressure control unit 341 via line 356 and from the cooler outlet line 714 is blocked by the land a. The brake inlet line 180 is connected to the space between the lands a and b adjacent land a and the exhaust port 701 is located between the lands a and b and adjacent land b. The cooler inlet line 703 is connected to the bore 692 at a point blocked by the land b. Brake outlet line 181 is connected in a space between the lands b and c adjacent land b and vent 704 is connected between the lands b and c adjacent land c.

The land a of valve 691 has a tapered shoulder 706 adjacent brake inlet line 180. When the brake is applied the valve 691 is moved into the valve bore 692 compressing spring 693. This movement uncovers the secondary line 356 gradually due to the tapered shoulder 706 and provides a gradually increasing flow from the secondary line 356 between lands a and b to the brake inlet line 180. At the same time, the brake outlet line 181 is connected between lands b and c to cooler feed line 703 and exhaust ports 701 and 704 are closed. The degree of movement of valve 691 regulates the volume of oil supplied in line 356 to the brake and thus controls the braking effort of the brake. Increasing flow of oil increases the quantity of oil in the brake chamber and the braking effort.

The converter outlet line 101 (FIG. 1) is connected through one-way check valve 712 and cooler inlet line 703 to a cooler 711. Check valve 712 prevents brake outlet oil flowing to the converter. The cooler outlet oil in line 714 flows to secondary line 356 to supply the brake, to the lubricating lines 716 and to front Pitot governor feed 715. The pressure in the lubrication line 716 is regulated by the pressure relief valve 718 and the excess oil is by-passed via line 719 to the sump.

*Hydraulic Controls*

The manual control unit 427 is employed by the operator to select one of four automatic ranges, low, intermediate, fifth gear hold and drive ranges, reverse or neutral. In low range, where the three ratio unit 46 is in low, either first or second ratio is automatically provided, depending on whether the splitter gear unit 27 is automatically positioned in splitter low or high by the governor and throttle actuated splitter shift valve unit 490. When the manual selector valve is positioned in the intermediate range, the three speed unit 46 is in intermediate and either third or fourth ratio is automatically provided by a second shift point of the splitter shaft valve unit 490 which shifts again under the influence of a different governor control and throttle control to provide either splitter low or high drive. In the drive range position of the manual valve, the automatic control provides third and fourth ratios previously available in intermediate range and, in addition, fifth and sixth ratios which are obtained by an automatic shift of the three ratio unit 46 from intermediate to high and a simultaneous downshift of the splitter valve and a third shift of the splitter shift valve from splitter low to high at a higher speed under the influence of another governor and the throttle pressure. Fifth gear hold range is the same as drive range except that the splitter shift valve is held in low when the rear unit is in high to prevent an upshift to sixth ratio, so only third, fourth and fifth ratios are provided.

In the table below, "X" shows the ratios available in each range and the gear ratio of both the splitter and three ratio unit that is engaged (the others being disengaged) to provide the six transmission ratios. The approximate numerical value of each ratio in converter and lockup drive is also shown.

the lockup cut-off valve 466 is momentarily raised supplying oil via by-pass 476 until the flow ceases and the pressure is equalized in these lines. The line 425 conveys oil at main line pressure to the manual valve unit 427 which, in the neutral position illustrated, blocks the line 425 between lands a and b of valve 428 preventing engagement of any ratio in the three speed unit 46 and to the splitter valve unit 490 which in the initial position shown in FIG. 4 connects line 425 between lands 491a and b to the splitter low line 150 to engage the splitter low device 35 to place the splitter unit in low. The transmission gearing, remains in neutral since the three ratio unit is not engaged in any gear ratio.

When the selector valve 427 is in neutral, the low and reverse lines 270 and 310 (FIG. 4) are maintained full of oil so that a rapid shift can be made between these gears for "rocking" the vehicle. Oil is supplied to reverse line 310 by orificed reverse make-up line 439 and limited to a low pressure only sufficient to fill but not actuate the reverse motor by the reverse relief valve 438 in exhaust 436. The low ratio line 270 and low motor is similarly filled with oil via orifice 562 and low make-up line 560 (FIG. 4) which is limited to a pressure insufficient to engage the low clutch by the low relief valve 558 at exhaust 557. The intermediate ratio line 250 is connected to exhaust through intermediate high shift valve unit 570, line 559, low intermediate shift valve unit 530, line 432 and manual valve unit 427 to exhaust 437. High ratio line 210 is connected at intermediate high shift unit 570 (FIG. 3) to exhaust 602. The splitter high ratio line 170 is con-

| Ratio | Gear Ratio Conv. | Lock-up | Neutral | Lo Rge. | Int Rge. | 5th Rge. | Drive Rge. | Splitter gear | | 3 speed unit | | | |
|---|---|---|---|---|---|---|---|---|---|---|---|---|---|
| | | | | | | | | Under Drive | Direct Drive | Lo | I | H | R |
| N | | | X | | | | | X | | | | | |
| 1 | 14 | 5 | | X | | | | X | | X | | | |
| 2 | 12 | 4 | | X | | | | | X | X | | | |
| 3 | 8 | 3 | | | X | X | X | X | | | X | | |
| 4 | | 2 | | | X | | X | | X | | X | | |
| 5 | | 1.5 | | | | X | X | X | | | | X | |
| 6 | | 1 | | | | | X | | X | | | X | |
| R | 17 | | | | | | | X | | | | | X |

When the vehicle starts from a standing start, the drive is transmitted through the torque converter which provides additional torque multiplication until a certain speed, preferably the speed at which the converter acts as a fluid coupling, and while the transmission is in first ratio, is reached. At this speed the lockup valve unit 445 (FIG. 5) moves under the influence of vehicle speed and throttle position to engage the lockup clutch 16 to provide a direct drive by-pasing the torque converter. The lockup clutch is also disengaged by the lockup cut-off valve unit 465 each time a change in the gear ratio is made in the six ratio unit so the fluid drive of the converter smooths the gear ratio change.

*Neutral*

When the vehicle is at rest and the engine is started with the manual valve unit 427 in neutral, the engine drives the converter impeller housing 2 which is connected to drive the front pump 106. Front pump 106 (FIG. 7) supplies oil under pressure via front pump line 327 through ball check valve 334 (FIG. 5) of the dual check valve 333 and main line 340. The ball check valve 336 prevents oil exhausting through rear pump line 329 and rear pump 321 which is now inactive. Main line (340) oil at a pressure regulated by regulator valve 341 is blocked at lockup valve unit 445 by land 446b and flows to throttle valve unit 401 (FIG. 6) to provide throttle pressure in line 408 if the throttle is advanced, and is connected at all times around the throttle valve 403 by the annular passage 404 to the lockup cut-off valve unit 465. Due to the initial filling of some ratio clutch motors, there is a pressure drop between main line 340 across the orifice 424 to the ratio change line 425, and nected by the splitter shift valve 491 (FIG. 4) between the lands b and c to the exhaust 506.

At this time the pressure in main line 340 is regulated solely by the main line pressure acting on the unbalanced area of lands b and c and the opposing action of spring 367, on valve 343 of pressure control unit 341 (FIG. 5) to provide a constant pressure.

When the pressure in main line 340 reaches the level controlled by the spring 367, valve 343 is raised until the land b permits the flow of oil to the secondary line 356. The right portion of the line 356 is connected to the brake control valve unit 690 to supply oil for the brake and the left portion of line 356 is connected to the lockup valve unit 445.

When the manual valve unit 427 is in neutral or any drive position and the lockup valve 445 in disengaged position, the secondary line 356 is connected between lands a and b of lockup valve member 446 to quickly fill the converter. The check valve 461 prevents flow from converter inlet line 100 through the low pressure line 362. Relief valve 462 in line 100 will be inactive in neutral, since it is set to unload at a higher pressure which is supplied by the main line 340 and the secondary line 356, only when the regulated pressure is raised by a control pressure such as the brake out pressure in line 181.

The oil will flow out of the converter through the converter outlet line 101, check valve 712, cooler 711 and cooler outlet line 714, to the front Pitot feed 715 and the lubricating system 716. The pressure in the converter is regulated by the regulating valve unit 341 which normally regulates the same pressure in the secondary line 356 and the main line 340. When there is an excess of oil for these lines, the regulator valve 343 moves up toward the exhaust position and vents the front pump line 327 directly past the land *a* to the low pressure exhaust port 361. At this time, since there is full regulated line pressure in converter inlet line 100, the oil in port 361 cannot flow through line 362 and will exhaust through the low pressure relief valve 363.

When the converter 4 is filled and the splitter low clutch 35 engaged in neutral, the converter and splitter low drives the intermediate shaft 33 and the front governor 51 to provide a low front governor pressure in line 220. The front governor line 220 is connected to the lockup valve unit 445 where it is opposed, when starting the vehicle, by greater spring and throttle forces to prevent lockup in neutral. Though racing the engine could upshift valve unit 445 to engage the lockup clutch, it would be disengaged by the lockup cut-off valve unit 465 when a ratio in the three ratio unit 46 is engaged to start the vehicle and then load would reduce the engine speed to downshift the lockup shift valve unit 445. The front governor line 220 is also blocked by land *d* of the low intermediate shift valve 533 and thus cannot act on splitter shift valve 491. The splitter shift valve 491 and the intermediate high shift valve 572 are held by their springs in the downshift position and the relay valve 531 and low intermediate shift valve 533 are held in the upshift position by their springs.

*Low Range*

When the vehicle is standing with the engine idling, and the manual valve unit 427 is moved to the low range position "Lo," the ratio change line 425 is connected between the lands *a* and *b* to the drive range line 432, the intermediate range line 433 and the low range line 434 and remains connected by splitter shift valve unit 490 (FIG. 4) to engage splitter low. Line 434 is connected to the low intermediate shift valve unit 530 between the splitter relay valve 531 and the low intermediate shift valve 533 to move these valves apart against the springs toward the ends of their respective bores to the low range position. Since there is no rear pump pressure in line 329 because the vehicle is standing, the relay valve 531 does not connect the rear pump by line 517 to upshift the splitter valve. The intermediate range oil in line 433 is connected to spring chamber or large bore 587 of the intermediate high shift valve unit 570 (FIG. 3) and acts on intermediate high blocker plug 583 to hold the intermediate high shift valve 572 in the intermediate position. The drive range line 432 is connected by the space between the lands *a* and *b* of the low intermediate shift valve 533 when in the low range position to the low ratio line 270 and is blocked from the intermediate high supply line 559 to prevent engagement of the intermediate ratio line 250 and high ratio line 210. Since low make-up line 560 and relief valve 558 keep low clutch line 270 full, the movement of the manual valve 427 to low range places the transmission in first ratio very quickly by supplying oil to raise the pressure in low ratio line 270 and engaging device 72 to place the three ratio unit in low ratio. The splitter gear unit having been in splitter low when the engine was started with the selector valve unit in neutral remains in splitter low. The transmission is in first ratio but with the engine at idling speed there is sufficient slip in the torque converter so that no drive is transmitted. As the driver advances the throttle and increases the engine speed, torque is transmitted and multiplied in the converter and the vehicle starts to move. The pressure in the converter chamber is controlled by valve 462 when the lockup clutch is disengaged and drive is transmitted through the converter. At the same time, the throttle linkage connected through lever 414 (FIG. 6) acts on the throttle valve unit 401 to move the downshift valve 411 which through the springs 415 moves the throttle valve 403. As the throttle is advanced, the land *a* of valve 403 uncovers the regulated line 340 so that oil flows between lands *a* and *b* to throttle line 408 which is also connected to the end of valve 403 to act on an unbalanced area of the valve and provide increased throttle pressure in line 408 with increasing throttle pedal position.

When the converter reaches the coupling stage, front governor pressure in line 220 acting on lockup plug 455 moves the valve 446 (FIG. 5) up at about four miles per hour to lockup position against spring 452 and throttle pressure in downshift line 418 acting on land *a*. Throttle pressure from line 408 is present in downshift line 418 except in sixth ratio since these lines are interconnected at the splitter shift valve unit 490 and the intermediate high shift valve unit 570 when these valve units are in the downshift position. When the valve 446 is moved to lockup position, the lockup feed line 395 is disconnected from exhaust 457 and connected between lands *b* and *c* to main line 340 which acts on the unbalanced area of lands *b* and *c* to provide hysteresis so that the lockup clutch is disengaged at a lower speed. Lockup feed line 395 is connected (FIG. 6) between lands *a* and *b* of lockup cut-off valve 466 to the lockup clutch line 90. The lockup feed line 395 conveys oil to the pressure control unit 341 at the lower face of land *b* of knockdown plug 349 to reduce the pressure in main line 340 and secondary line 356. The main line pressure is always increased with increasing throttle pressure in line 408 and brake pressure in line 181 as explained in the above description of the pressure control unit 341.

When the lockup valve unit 445 is in lockup position directing engagement of the lockup clutch, the secondary line 356 is blocked by land *b* of valve 446 and cannot supply the converter inlet line 100. As the pressure in the converter decreases due to leakage and flow to the cooler, the low pressure exhaust from the pressure control unit 341 at port 361 will flow through the line 362 and check valve 461 to the converter inlet line 100 and provide a low pressure feed at the pressure regulated by the relief valve 363.

As the vehicle accelerates, the front Pitot pressure 220, the rear governor pressure 320, and the rear pump pressure in line 329 having orifice 331, increases in proportion with the rear wheel speed.

Splitter shift valve unit 490 in low range, is held in low by spring 502 whenever the vehicle is standing to connect the ratio change line 425 to the splitter low ratio line 150 and then conditioned for an automatic shift by rear pump oil which disables the spring when the vehicle moves and then is automatically shifted by throttle and governor pressures to connect the splitter low ratio line 150 to the splitter low exhaust line 493 and connect the ratio change line 425 to the splitter high ratio line 170.

When the vehicle starts to move the rear pump pressure in line 329 acts on the lower face of rear pump plug 497 to lift spring to free the valve 491 so that rateless valve control is obtained. The throttle pressure in line 408 is connected to the end of the bore 492, which is closed by plug 497, and urges valve 491 toward the splitter low position. Though throttle pressure line 408 is connected in bore 492 to downshift line 418 which is exhausted through orifice 419 (FIG. 6), the small orifice 419 does not reduce this pressure enough to affect the operation. The governor pressure proportional to speed acts to move the splitter valve 491 up to splitter high position. The low intermediate valve 533 now in low range position connects front governor line 220 to relay controlled front governor line 521 and disconnects it from port 561. Front governor line 521 is connected to splitter valve unit 490 to act on the lower face of front governor plug 518. The lower pressure rear governor oil in line 320, though acting on the lower face of the rear governor plug 522 is ineffective, since it is not high enough to overcome front governor pressure acting down on the plug. The intermediate high controlled rear governor line 526 is connected to exhaust at the intermediate high valve unit 570. The rear pump line 329 is connected to the relay valve 531 which in the low range position is raised and disconnects line 329 and connects controlled rear pump line 517 to exhaust 541. The splitter valve 491 is thus controlled by the throttle pressure which tends to move the valve toward splitter low position and the front governor pressure acting via relay controlled line 521 to move the valve up to the splitter high position at about 12 miles per hour depending on throttle position. The splitter shift valve 491 which in first ratio connects ratio change line 425 to splitter low ratio line 150 and splitter high ratio line 170 to exhaust 506, shifts up for second ratio to connect ratio change line 425 to splitter high ratio line 170 and splitter low ratio line 150 to splitter low exhaust line 493 which regulates overlap as explained below.

When the ratio change line 425 is connected to splitter high line 170, the flow to fill the splitter high motor 39, from line 340 across orifice 424 to line 425 reduces the pressure acting on land $a$ of lockup cut-off valve 466 to upshift the valve so that lockup clutch line 90 is connected to exhaust 468 to disengage the lockup clutch 16 and the lockup clutch feed line 395 is blocked.

When the splitter shift valve 491 first moves to splitter high position, the splitter low line 150 is connected to the splitter low exhaust line 493 which is initially blocked between the lands $a$ and $b$ of valve 651 of the low exhaust control valve unit 650. With throttle pressure 408 and the spring 654 normally urging the valve 651 down, the splitter low exhaust line 493 and connected splitter low clutch line 150 are normally closed at valve 651 except for the bleed orifice 655. As the pressure line 493 builds up due to the splitter low clutch retraction spring, this exhaust pressure acts on the unbalanced area of lands $a$ and $b$ and raises the valve to connect the controlled exhause line 493 to exhaust port 657 to control the splitter low exhaust at an intermediate pressure to provide the proper overlap during this shift. The throttle pressure acts on valve 651 to increase the overlap with increased throttle. If during the time interval when the splitter high clutch motor is being filled, there is excessive leakage from the splitter low motor, or there is an increase in throttle pressure, the valve will be lowered to connect the splitter low feed line 512 to the splitter low exhaust line 493 to increase the controlled exhaust pressure from the splitter low motor. Then as the splitter high line 170 and motor fill up and the pressure increases, this pressure acts beneath the splitter low exhaust plug 661 to raise low exhaust valve 651 to connect the splitter low exhaust line 493 to exhaust 657 to gradually reduce splitter low exhaust pressure for disengagement at the time splitter high is engaged.

As soon as the splitter high motor 39 is filled and the flow ceases in controlled line 425, the pressure equalizes across orifice 424 of the lockup cut-off valve unit 465 and the valve 466 is returned to its normal position by spring 471 connecting the lockup feed line 395 to the lockup clutch line 90 to reengage the lockup clutch.

If the vehicle speed is decreased to about 11 miles per hour so that the relay controlled front governor pressure line 521 with the assistance of the direct clutch pressure in line 170 acting on the unbalanced area of lands $491b$ and $c$ cannot hold the valve up against the throttle pressure in line 408 and downshift line 418, the splitter shift valve 491 will move to the splitter low position. In low range the throttle pressure line 408 is connected by bore 573 of the intermediate high shift valve unit 570 to downshift line 418 so that throttle pressure always acts on splitter shift valve 491 even though land $a$ blocks throttle pressure line 408 in upshift position. In the splitter low position, the valve 491 connects the splitter high line 170 to exhaust between lands $b$ and $c$ to exhaust 506 and the ratio change line 425 to the splitter low line 150. The controlled exhaust line 493 is blocked by land $a$, the limited feed line 511 is blocked by the land $c$ and low exhaust feed line 512 is connected to exhaust 513.

It is also possible to manually downship from splitter high to splitter low in low range by moving the throttle pedal to full throttle position or slightly beyond to move the downshift valve 411 toward the throttle valve 403 so that the throttle pressure in line 408 is equal to main line pressure. Then the throttle pressure line 408 is connected between lands $a$ and $b$ of valve 411 to the downshift line 418 which is connected (FIG. 6) to the upper end of bore 492 to act on land $a$ to downshift splitter valve 491 to the splitter low position shown. The throttle line 408 is also connected to port 422 and the space between the land $b$ and $c$ to act on the unbalanced area of the land $c$ when land $c$ enters the bore 423 to provide a hydraulic detent so the driver can feel when the downshift valve 411 reaches downshift position. When the accelerator pedal is returned from the downshift position to the normal driving range position, the land $411a$ blocks the throttle line 408 and downshift line 418 but downshift line 418 is exhausted by the annular port through the orifice 419 to the exhaust 421 to restore normal governor and throttle pressure operation of the shift valves. However the orifice 419 is small and does not interfere with the buildup of downshift pressure in the line 418 or the throttle pressure in line 408 which, as pointed out above, are interconnected at splitter shift valve 490.

When the splitter high valve unit 490 upshifts to high, the splitter high line 170 is also connected to the space below land $c$ of the regulator valve 343 to reduce main line pressure in converter drive. If the transmission is in lockup, lockup feed line 395 acting on land $b$ of plug 349 reduces the main line pressure and the splitter high clutch pressure in line 170 does not further reduce the main line pressure. During the engagement of each ratio the trimmer unit 640 controls the pressure rise as explained above.

In low range, first or second ratio, the high clutch line 210 is connected between lands $b$ and $c$ of intermediate high shift valve 572 to exhaust 602 and the intermediate clutch line 250 is connected between lands $a$ and $b$ of intermediate high valve 572 to intermediate high supply line 559 which is connected between lands $b$ and $c$ of low intermediate valve 533 to controlled exhaust 561.

*Intermediate Range*

When the vehicle has reached the proper speed in second ratio and third ratio is desired, the transmission is shifted from low range to intermediate range by manually moving the manual valve unit 427 from low to intermediate position. In this position, the selector valve land $428b$ blocks the flow of oil from the ratio change line 425 to the low range line 434 but permits flow to continue to the drive range line 432 and the intermediate range line 433. When the supply to the low range line 434 is cut-off and the line 434 connected to exhaust port 437, the oil pressure between the relay valve 531 and the low intermediate valve 533 is relieved to permit the springs to return these valves to the central position.

The sequence of operation during a low to intermediate range manual shift described below, is the same as the third and fourth ratio operation for a low to drive range shift except that the intermediate range line 433 is exhausted permitting the intermediate high shift valve to upshift to fifth and sixth ratio.

The spring 536 returns relay valve 531 at a moderate speed since a substantial flow is permitted from the sump through exhaust 546, orifice 548 and check valve 547 to spring chamber 543. Though, as the relay valve 531 passes mid-position, the rear pump line 329 is momentarily connected to relay controlled rear pump line 517 which acts on land $d$ of splitter shift valve 491, this has no effect since the valve 491 is in the splitter high position.

When the spring 552 moves the low intermediate shift valve 533 to the intermediate position as illustrated in FIG. 4, the splitter low line 270 is connected through low pressure relief valve 558 to exhaust 557 to keep the low motor full and the drive range line 432 is connected between the lands b and c to the intermediate high supply line 559. The front governor line 220 is blocked by the land d of valve 533 and thus disconnected from the controlled front governor line 521 which is connected to controlled exhaust 561. The intermediate high supply line 559 conveys main line oil from drive range line 432 to the intermediate high valve unit 570 between the lands a and b of valve 572 to the intermediate clutch line 250 and through the downshift timing valve 630 to engage the intermediate clutch. The downshift timing valve 630 will connect intermediate clutch line 250 between lands 631a and b without restriction on a high throttle upshift but will provide a restriction on low throttle upshift.

Since the intermediate range line 433, in intermediate range as in low range, is supplied with oil under pressure from controlled main line 425 by manual valve unit 427 and this line 433 enters spring chamber 587, the oil acts on the intermediate high blocker plug 583 to hold the intermediate high shift valve unit 570 in intermediate position regardless of vehicle speed. If the pressure on or the area of land b of blocker plug 583 is reduced, the governor forces acting on the intermediate high shift valve unit 570 will upshift the transmission to protect the engine against being run at excessive speeds. Since the brake is used to prevent excessive speeds, when the transmission is held in fourth ratio by the blocker plug, the blocker plug 583 will hold the intermediate high valve 572 in intermediate at any vehicle speed.

When the low intermediate shift valve 533 moves up to intermediate position and cuts off the front governor line 220 at land d, from the relay controlled front governor line 521, the relay valve 531 in intermediate position cuts off the rear pump line 329 from a relay controlled rear pump line 517. Since the controlled rear pump line 517 and the controlled front governor line 521 are cut off and do not act on the splitter valve 491 and the intermediate high controlled rear governor line 526 is exhausted at port 607, the only governor force acting on the splitter valve 491 is the rear governor line 320 which flows through orifice 527 and acts on the end face of rear governor splitter plug 522. The orifice 527 and accumulator 529 delay the build-up of rear governor pressure from line 320 on plug 522 of the splitter shift valve unit 490 so that the throttle pressure acting on land 491a will downshift this valve against the hysteresis and rear governor pressure. The rear pump pressure in line 329 continues to keep plug 497 and spring 502 free of valve 491, so the valve 491 is rateless. Thus at all vehicle speeds when the manual valve is moved from low to intermediate range to effect a low to intermediate shift in three ratio unit 46, the splitter shift valve will, at the same time, downshift splitter high to low position illustrated in FIG. 4 to effect a splitter high to low shift of the two speed unit 27 and the transmission will be in third ratio. If this 2nd–3rd ratio manual shift is made below the 3rd–4th ratio upshift speed which may be 24 miles per hour, the transmission will remain in 3rd ratio until the normal 3rd–4th ratio upshift occurs, but if it is made above this speed the transmission will shift to 4th ratio as soon as orifice 527 passes enough rear governor oil through line 320 to fill accumulator 529 and upshift splitter valve 491.

If the lockup clutch 16 was engaged in low range by the lockup valve unit 445, the lockup clutch would be disengaged during the manual 2nd–3rd ratio shift. As during all shifts, the oil flowing on this shift from main line 340 through orifice 424 to ratio change line 425 to the intermediate and splitter low clutch motors actuates lockup cut-off valve unit 465 to disconnect lockup feed line 395 from lockup clutch line 90 to disengage the lockup clutch as long as flow continues.

Under normal driving conditions, the vehicle will be started on substantially level ground under a moderate load in intermediate range. When the transmission is in neutral as described above in neutral range operation, the front pump 106 supplies oil to the regulator valve unit 341 which provides a regulated pressure in main line 340, secondary line 356 and ratio change line 425. With the vehicle at rest, the front governor pressure is low and the lockup valve unit 445 is in converter drive or lockup clutch disengaged position illustrated in FIG. 5 disconnecting lockup feed line 395 and connecting the line 356 to the converter inlet line 100. The splitter valve unit 490 is held in the underdrive position by spring 502 connecting the ratio change line 425 to the splitter low clutch line 150 to place the splitter gear unit 27 in low. As in shifting from neutral to low range, the shift from neutral to intermediate range does not affect the splitter gear unit.

In neutral, as described above, the selector valve unit 427 connects the range lines 432, 433 and 434 to exhaust 437 and since oil is not supplied to the low, intermediate, high or reverse motor, the three ratio unit 46 is in neutral. When the manual valve unit 427 is moved from neutral to the intermediate position, the drive range line 432 and the intermediate range line 433 are engaged while the low range line 434 remains connected to exhaust 437. The intermediate range line 433 is connected, as in low range, to intermediate high shaft valve unit 570 at the upper end to act on intermediate high blocker plug 583 to hold the intermediate high shift valve 572 in intermediate position. The drive range line 432 conveys fluid from the ratio change line 425 to the low intermediate valve unit 530 which in intermediate range is held in the position shown by the spring 552 since low range line 434 is exhausted. In intermediate range the low intermediate valve 533 connects the drive range line 432 to the intermediate high supply line 559 which is connected between the lands a and b of the intermediate high shift valve 572 to the intermediate line 250 and downshift timing valve 630 to engage the intermediate ratio. On this manual shift into intermediate range, 3rd ratio, with the vehicle standing the downshift timing valve 630 is in the restricting position since the three ratio unit has not been in low ratio. The intermediate clutch line 250 acts on lockup knockdown plug 349 to reduce the pressure decreasing effect of lockup feet pressure in line 395. The high clutch line 210 is connected between the lands b and c of the intermediate high shift valve 572 to exhaust 602. The low line 270 is connected between the lands a and b of the low intermediate shift valve 530 to the controlled exhaust 557 and valve 558 which keeps the low motor full. The reverse line 310 is connected through selector valve 427 to controlled exhaust 436 and valve 438 which keeps the reverse motor full. Relay valve 531 is also held in intermediate position by spring 536 since low range line 434 is exhausted, blocking rear pump line 329 and exhausting the controlled rear pump line 517 connected to the splitter valve.

Since the splitter valve unit 490 normally engages the splitter gear in low, the engagement of the intermediate gear of the three speed unit by shifting the manual valve unit 427 to intermediate range, places the transmission in third ratio converter drive. When the engine is idling no drive is transmitted but when it is accelerated the vehicle will move and the front governor line 220 provides a pressure proportional to the rear wheel speed as modified by the intermediate gear ratio which acts on the lower face of the lockup plug 455 and tends to shift the lockup valve 446 against the opposing force of spring 452 and throttle pressure from line 418. When the vehicle has reached a speed at which torque multiplication is not required and the converter reaches the coupling stage, the lockup valve 446 will upshift as in low range operation to connect the main line 340 to the lockup feed line 395 and lockup cut-off valve 466 to the lockup clutch line 90. The upshift of the lockup valve unit 445 to engage the lockup clutch also moves land b to block flow from the secondary line 356 to the converter inlet line 100 to provide a low pressure converter feed from low pressure feed line 362 and exhaust 361 of the regulator valve 343, as explained above, in low range lockup. The lockup valve unit 445 may be set to upshift at 10 miles per hour and then due to the hysteresis effect on the unbalanced lands will downshift at about 8 miles per hour at full throttle. The throttle pressure line 408 is connected by downshift line 418 to the lockup valve 445 except in sixth ratio to provide throttle downshifts. A forced disengagement of the lockup clutch by the downshift pressure is provided. Thus high throttled and forced disengagement of the lockup clutch is provided in the first to fifth ratios and only forced disengagement in sixth ratio below certain engine speeds.

The splitter valve unit 490 is normally held in the underdrive position illustrated in FIG. 4 by the spring 502. As in low range, when the vehicle gets under way, the rear pump pressure, proportional to vehicle speed, is connected by line 329 beneath the rear pump splitter plug 497 to lift the plug so the spring 502 and plug 497 cannot act on the valve 491 which is thus rateless and conditioned for an upshift. In intermediate range throttle pressure from line 408 acts down on land 491a and the rear governor pressure in line 320 is connected to the end of large bore 523 to act up on the rear governor splitter plug to urge the valve to upshift position. The relay controlled rear pump line 517 is connected by relay valve 531 to exhaust 541 thus rear pump pressure does not act on splitter valve 491. The front governor pressure in line 521 does not act on the front governor splitter plug 518, since line 521 is disconnected from front governor line 220 by land $d$ of the low intermediate shift valve 533 and connected to exhaust port 561. Since intermediate high shift valve 572 is in intermediate position, rear governor line 320 is blocked by land $c$ and controlled rear governor pressure in line 526 which in high ratio acts down on plug 524 of the splitter valve is connected to exhaust 607.

When the rear governor pressure overcomes the throttle pressure, at about 24 miles per hour, and upshifts splitter valve 491 to provide a 3rd to 4th ratio shift, the splitter high line 170 is disconnected from exhaust 506 and connected between lands $b$ and $c$ to ratio change line 425. The ratio change line 425 is disconnected from splitter low line 150 which is connected between the lands $a$ and $b$ to the splitter low exhaust line 493. The exhaust from the splitter low clutch is conducted by clutch line 150, valve 491 and splitter low exhaust line 493 to the low exhaust valve unit 650 to control the splitter low exhaust to provide the proper degree of overlap in the same way as fully explained above for the upshift of the splitter valve unit 490 in low range. Since the three ratio unit 46 is in intermediate ratio, the engagement of splitter high of the two ratio splitter unit 27 and the disengagement of splitter low places the transmission in 4th ratio.

When a low to intermediate range manual shift is made at speeds above the third-fourth upshift point of the splitter valve unit 490, the low to intermediate ratio shift of the three-speed unit 46 will occur in the same way as described above for the second to third ratio shift but the splitter valve unit 490 will not downshift providing a second to fourth ratio shift.

In the intermediate range when the splitter valve unit 490 shifts from splitter low or third ratio to splitter high or fourth ratio, there is flow from the line 425 to fill the direct drive clutch cylinder. In the same way as explained above in low range operation, the flow through line 425 and orifice 424 causes the trimmer unit 640 to regulate the apply pressure and the lockup cut-off valve unit 465 to disconnect the lockup feed line 395 from the lockup clutch line 90 to disengage lockup clutch.

The splitter valve unit 490 (FIG. 4) may be downshifted from 4th ratio by an increase in the throttle pressure in line 408 and interconnected downshift line 418 due to increasing throttle pedal position or a decrease in rear governor pressure in line 320. Due to the hysteresis effect on the unbalanced area of the splitter valve 491, after a full throttle upshift at 24 miles per hour, the downshift due to a reduction in speed will occur at about 21 miles per hour at full throttle and somewhat lower at closed throttle. The splitter valve may also be downshifted when the throttle valve unit 401 is moved to downshift position by downshift pressure in line 418 which acts on land 491a. This 4th to 3rd ratio shift will actuate the lockup cut-off valve unit 465 to disengage the lockup clutch 70.

When the manual valve unit 427 is moved to the intermediate range and is in 3rd ratio with lockup shift valve 446 upshifted, the intermediate clutch line 250 is energized and oil acts downwardly on the knockdown plug 349 of the pressure control unit 341 to reduce the pressure decreasing effect of the lockup feed oil in line 395 acting on the knockdown plug 349 to reduce the main line pressure which provides main line 340 a pressure slightly higher than in other ratios during lockup. When splitter high is engaged, as in 4th ratio, the splitter high clutch line 170 acts on land $c$ of pressure regulator valve 342 to reduce the pressure in main line 340 to the same extent that lockup feed pressure in line 395 reduces the pressure. When the splitter gear is in high or the lockup valve 446 upshifted or both, the same reduction in regulated pressure in main line 340 is obtained except that in 3rd ratio, where the intermediate clutch line 250 is supplied with fluid under pressure and acts on plug 349 to increase the main line pressure when reduced only by lock-up valve 446 and line 395 by reducing the main line pressure reducing effect of lock-up pressure. When the converter is operating in 1st and 3rd ratios, there is a much higher main line pressure in line 340. These main line pressures are also increased with increasing throttle pressure in line 408 and brake pressure in line 181.

In the intermediate range, the vehicle is started in third ratio and upshifts due to the upshift of the splitter valve unit 490 (FIG. 4) only to fourth ratio and cannot upshift to fifth ratio since the intermediate high valve unit 570 is held in the intermediate position by the intermediate range oil in line 433 and cannot downshift to 2nd ratio.

The transmission can be manually shifted from intermediate to low range by moving manual valve 427 from "Int" to "Lo" to provide a forced downshift from fourth or third ratio to second or first ratio. As explained above in low range, the manual valve in "Lo," energize the high range line 432 to supply oil to the low intermediate valve unit, the intermediate range line 433 to hold the intermediate high valve unit 570 in intermediate position and the low range line 434 to move the relay valve 531 and the low intermediate valve 533 to low position.

Low range oil from line 434 downshifts low intermediate valve 533 to disconnect ratio change line 432 from intermediate high supply line 559 which is connected by intermediate high valve unit 570 to intermediate line 250 and to connect it to low line 270 to engage the low ratio of the three-speed unit 46. This ratio will be quickly engaged since low relief valve 558 kept the lines and motor filled with oil. The intermediate motor is exhausted by line 250 which is connected through intermediate high valve to intermediate high feed line 559 which is connected between lands $b$ and $c$ of valve 533 to exhaust port 561. Since low clutch line 270 is exhausted when this 3rd–2nd shift is initiated, valve 630 is closed and intermediate exhaust is restricted by orifice 636. The movement of low intermediate valve 533 to low also connects front governor line 220 to controlled front governor line 521 to act on plug 518 of the splitter valve 490 to provide 1st to 2nd ratio shifts.

The low range oil in line 434 also acts on land $c$ of relay valve 531 and moves the valve up quickly until exhaust 541 is closed and the oil which always fills chamber 543 above the valve 531 slows further movement. This first movement of valve 531 connects rear pump line 329 to controlled rear pump line 517 which acts on land d of splitter valve 491 for a limited time starting with the intermediate low shift to positively position the splitter valve in splitter high position. This insures a 4th to 2nd or 3rd to 2nd shift and prevents a 4th to 1st or a 3rd to 1st shift which would be rough. The low range oil continues to urge valve 531 up and there is sufficient leakage to permit very slow movement until the valve 531 engages stop 538 and land c blocks rear pump line 329 and controlled rear pump line 517 is connected to exhaust 541. Then the splitter valve 491 functions as in low range operation to automatically control shifts between 1st and 2nd ratio as explained above. At very low speeds after a 3rd to 2nd manual shift, a 2nd to 1st automatic shift would occur substantially instantaneously to provide a smooth 3rd to 2nd to 1st shift.

*Drive Range*

When the transmission is placed in drive range by positioning the manual valve unit 427 in "D" position, the transmission starts in third ratio and automatically shifts between third, fourth, fifth and sixth ratios. The controls are the same as in intermediate range, except that the intermediate range line 433 is exhausted, so the intermediate high valve unit 570 (FIG. 3) is free to upshift under the influence of rear governor and throttle pressure and the drive signal line 435 is supplied to move the fifth gear to hold piston 501 on the splitter shift valve unit 490 to prevent operation of the fifth gear hold system. The rear governor pressure in line 320 is at low speeds insufficient to lift the blocker plug 583 and intermediate high valve 572 is held in intermediate by spring 591. The vehicle thus starts in 3rd ratio and will be automatically upshifted by splitter valve unit 490 to 4th ratio as in intermediate range. Since intermediate high valve 572 is free, when the speed increases in fourth ratio to the proper value, about 33 miles per hour, valve 572 will shift the three speed unit from intermediate to high and the splitter valve 491 will downshift the two speed unit from direct to underdrive for the 4th to 5th ratio shift.

When the transmission is operating in fourth ratio in the intermediate range and the manual valve unit 427 is manually shifted to drive range, the intermediate range line 433 is disconnected from the ratio change line 425 and connected to exhaust 437 to remove the line pressure from the end of land b of the intermediate high blocker plug 583 and permit the intermediate high shift valve 572 to automatically shift from the intermediate position in which it was held during intermediate range drive to the high range position under the influence of governor and throttle pressure. The operation of the splitter valve unit 490 and the low intermediate valve unit 530 are not changed by the movement of the manual valve from intermediate to drive range position, so the transmission is not manually shifted, but merely conditioned for automatic shifting between 4th and 6th ratios and not held in the intermediate range limits of 3rd and 4th ratios. When a shift to high range is made from 3rd ratio, the splitter valve unit 490 will automatically upshift at the proper speed to provide 4th ratio as explained above in the intermediate range.

The 4th to 5th ratio shift is automatically controlled by intermediate high valve unit 570 under the control of throttle and rear governor pressure. The throttle pressure in line 408 is connected to the end of bore 573 of valve unit 570 below end wall 581 and the stud 582 to act upon the face of land a of valve 572 to urge it in the downshift direction toward the intermediate position illustrated in FIG. 3. The rear governor pressure in line 320 is connected to the intermediate high valve unit 570 at the port 593 to act upwardly on blocker plug 583 against spring 591 to first move the blocker plug 583 up to free valve 572 to condition the valve for a rateless intermediate high shift and is connected at the port 617 to act upwardly on the lower face of the governor plug 616 to overcome the throttle pressure acting downwardly on valve 572 for an upshift. The intermediate high shift valve 572 in upshift position disconnects the intermediate high supply line 559 from the intermediate ratio line 250 and high clutch line 210 from exhaust 602 and connects intermediate high supply line 559 to the high clutch line 210 and the intermediate ratio line 250 to controlled intermediate exhaust line 601.

A hysteresis or spread between the upshift and downshift points is obtained partially due to the fact that the intermediate high supply line 559 is connected between unbalanced lands b and c to the high clutch line 210. The controlled intermediate exhaust line 601 is connected at port 626 to the end face of the accelerator plug 624 to act upwardly to provide an upshift force or additional hysteresis effect on the intermediate high valve 572 during the short interval that the intermediate exhaust valve unit 670 retains a pressure in the intermediate exhaust line 601. This connection of line 601 to plug 621 of shift valve 572 quickly provides an accelerating force to prevent a downshift until the high ratio clutch pressure in line 210 increases when the clutch is substantially engaged and thus prevents hunting of this shift valve.

The flow of oil to engage the high clutch closes the lockup cut-off valve unit 465 to disengage the converter lockup clutch 70 as in other ratio changes. When there is flow through the high clutch line 210 to fill the high clutch cylinder 49, there is also flow through the supply lines, the intermediate high supply line 559, the drive range line 432 and the ratio change line 425. The flow in ratio change line 425 passes through the orifice 424 and lowers the pressure below the pressure in main line 340 to raise the lockup clutch cut-off valve 466 to the cut-off position and disconnect the lockup feed line 395 from the lockup clutch line 90 and connect line 90 to exhaust 468. The valve 466 moves up quickly to sharply disengage the lockup clutch. When the high clutch is substantially engaged, the pressure is substantially equalized across the orifice 424, and the spring opens the lockup cut-off valve 466 to reconnect lockup clutch feed line 395 to lockup clutch line 90. However this movement is slow, since an orifice 481 limits flow to the upper end of the bore 467.

On the intermediate to high shift the exhaust from the intermediate clutch line 250 will be restricted by orifice 636 since the downshift timing valve unit 630 is closed due to the lack of pressure in low ratio line 270. Since the intermediate exhaust control valve 670 restricts the intermediate exhaust more than orifice 636, the downshift timing valve unit 630 does not affect the intermediate exhaust.

The source A delivers oil to the limited feed line 511 which is connected to the valve unit 570 where it is blocked in intermediate position by land d and connected in the high position to the intermediate exhaust feed line 608. The intermediate exhaust valve unit 670 is similar to the low exhaust valve unit 650 and provides overlap during the intermediate high shift. The controlled intermediate exhaust line 601 is connected to exhaust on line 675 to insure exhaust if the valve 671 sticks and between the unbalanced lands a and b of the valve 671 (FIG. 7) and tends to urge valve up to the exhaust position to connect line 601 to exhaust 677 to reduce the pressure. The spring 674 and the throttle pressure 408 act on the end face of land 671a and tend to urge the valve down to close the exhaust 677 and open the intermediate exhaust feed line 608 which can supply a limited volume of oil to the intermediate exhaust controlled valve unit 670 to raise or maintain a low pressure in the intermediate exhaust line 601. If, during the shift period, leakage reduces the intermediate exhaust pressure or the throttle is depressed increasing throttle pressure in line 408, the valve 671 will open to increase the exhaust pressure from the intermediate clutch. As the high clutch motor 49 is filled, and the clutch engaged, the pressure in the high clutch line 210 will increase and act upon the lower face of the intermediate exhaust plug 681 to move the intermediate exhaust valve 671 to the exhaust position and relieve the pressure in controlled intermediate exhaust line 601 and intermediate clutch cylinder.

The intermediate exhaust control valve unit 670 provides a uniform overlap during the intermediate high shift. The intermediate exhaust is initially established at an intermediate level established by a balance between intermediate exhaust acting on the unbalanced area of valve 671 and spring 674. This initial pressure level is increased with increased throttle by connected throttle pressure in line 408 to act with spring 674 on valve 671. Then as the high clutch is being engaged and the pressure in line 210 gradually increases, the valve 671 controls an inversely proportional gradual decrease in intermediate clutch line 250. If there is insufficient leakage in the intermediate clutch and lines, the valve 671 will provide a connection to exhaust or if there is excessive leakage the valve 671 will add oil from feed line 608 to increase or hold intermediate clutch pressure at the proper value. In this way the release of the intermediate clutch is positively controlled by the engagement of the high clutch to provide the proper overlap regardless of factors such as leakage at the clutch motor and shift valve which vary within manufacturing tolerances.

When the intermediate high shift valve unit 570 upshifts from the intermediate to the high position, it also connects the rear governor line 320 which in the intermediate position has been blocked by the land c between the lands c and d to the controlled rear governor line 526. The line 526 is connected to large bore 523 of the splitter valve unit 490 and acts upon the upper face of the rear governor splitter plug 522 to partially oppose the rear governor pressure from line 320 acting on the larger lower face of this plug 522. This reduces the effective area on which the rear governor pressure acts. This reduction in the governor pressure force acting on the splitter valve unit 490 when the intermediate high valve unit 570 shifts from intermediate to high position is under normal conditions where the upshift occurs with the vehicle being accelerated under substantially constant throttle sufficient to cause the splitter valve 491 to downshift from the splitter high position to the splitter low position. As explained above, this downshift of splitter valve 491 connects the splitter high clutch line 170 to exhaust 506 and the ratio change line 425 to supply the splitter low clutch line 150 to downshift the splitter gear unit and blocks the limited control feed line 511. The orifice 527, on this 4–5 shift delays the exhaust of rear governor pressure in line 320 to insure that the splitter valve does not downshift the splitter gear unit before the rear unit is upshifted from intermediate to high. The accumulator 529 does not affect this timing since it cannot be charged until the pressure in the intermediate clutch line is substantially reduced.

The shift from intermediate to high and the downshift of the splitter unit from direct drive to underdrive occurs substantially simultaneously and provides the shift from fourth to fifth ratios at about 33 miles per hour at full throttle. It will be appreciated that during the interval that the motors are being filled that the lockup clutch 16 will be disconnected.

When the vehicle is on a downgrade or under light load, when an automatic intermediate to high shift is made under the control of the intermediate high valve unit 570 that due to a large decrease in throttle pressure or a large increase in rear governor pressure, that the splitter valve unit 490 will not downshift, but would remain in splitter high, then a fourth ratio to sixth ratio shift would be made.

After a 4th to 5th shift, a further increase in the rear governor pressure in line 320 due to an increase in vehicle speed will upshift the splitter valve unit 490 at about 46 miles per hour. The splitter high drive in the splitter unit 27 and high in the three speed unit 46 provide 6th ratio. As pointed out above when the intermediate high valve is in high, rear governor pressure in line 320 and line 526 acts on the plug 522 to provide a net upshift force on splitter valve 491. The relay controlled rear pump line 517 and controlled front governor line 521 are exhausted. The upshift of the splitter valve supplies oil to splitter high line 170 for splitter high drive and controls splitter low exhaust in line 150 similar to the previously described upshifts which occur in low and intermediate range. The flow of oil to the direct drive line 170 disengages the lockup clutch 16 and provides make-up oil in line 512 to control the exhaust of splitter low clutch line 150 by the splitter low exhaust valve unit 650.

Under a very light load or a downgrade, where the operator after accelerating would close the throttle, the transmission may automatically shift from 3rd ratio to either 5th or 6th ratio depending on the vehicle operating conditions speed and throttle opening. The accumulator 529 will not affect these shifts.

When the transmission is in sixth ratio, throttle pressure does not act to downshift the shift valves, the high intermediate valve unit 570 or the splitter valve unit 490 or converter lockup valve unit 445 since the high intermediate valve unit 570 and splitter valve unit 490 are upshifted and block the connections between throttle line 408 and downshift line 418. However when the vehicle speed is reduced, the rear governor pressure in line 320 is reduced to permit spring 591 to act through blocker plug 583 to downshift the intermediate high valve unit 570 first to disconnect the high clutch line 210 and to connect the intermediate line 250 to intermediate high supply line 559 to slowly engage the intermediate clutch through orifice 636. At this time the rear governor pressure has not reduced sufficiently to permit spring 502 to downshift the splitter valve unit 490 so there will be no 6th to 5th downshift. Since low line 270 is exhausted on a 6th–4th ratio shift, the downshift timing valve 631 is closed blocking the free by-pass so flow to the intermediate clutch passes through orifice 636 to soften the clutch engagement on these downshifts. When the intermediate high valve unit 570 downshifts, the land c blocks rear governor line 320 and connects controlled rear governor line 526 to exhaust 607 to increase the net area on which rear governor oil in line 320 acts on plug 522 of the splitter valve 490. The downshift of the intermediate high valve unit 570 also connects throttle line 408 and downshift line 418 so that throttle oil is connected by downshift line 418 to act down on splitter valve 490. This increase in net area on which the rear governor pressure acts will provide a 6th to 4th ratio shift which with falling vehicle speed or a high throttle pressure is followed by a downshift of the splitter valve unit 490 to provide a 4th to 3rd ratio shift. If vehicle speed is falling very rapidly or throttle pressure is high, these shifts may occur substantially simultaneously for a 6th to 3rd shift.

In 5th ratio, throttle oil from line 408 is connected at the splitter valve unit 490 to downshift line 418 and thus acts on all shift valves. In this ratio, a downshift occurs when throttle pressure increases or rear governor pressure decreases. The intermediate high valve unit 570 first downshifts to disconnect high clutch line 210 and to connect intermediate line 250 to engage intermediate ratio of the three speed unit. This downshift also vents the controlled rear governor line 526 to increase the effective area of plug 522 on which rear governor oil acts in splitter valve unit 490. Also when intermediate ratio is engaged fluid from intermediate linne 250 discharges accumulator 529 to momentarily supply an increased pressure to bore 523 to act upon plug 522 until the pressure equalizes across orifice 527. These factors normally upshift the splitter valve 491 to connect the ratio change line 425 to direct drive line 170 to engage splitter high to place the transmission in 4th ratio. This insures a 6 to 4 or a 5 to 4 shift under normal conditions. As in other splitter gear upshifts the underdrive exhaust is controlled by low exhaust control valve 650. If the vehicle speed is falling fast and the governor pressure is insufficient to charge the accumulator, the governor pressure would generally be insufficient to upshift the splitter gear unit, a 5th to 3rd ratio shift will occur. In 4th ratio, throttle line 408 and downshift line 418 are connected at the intermediate high shift valve unit 570, to provide with high throttle or low speed a downshift of splitter valve unit 490 for 3rd ratio.

Since the throttle line 408 is disconnected from the shift valves in 6th ratio, the normal downshift is a forced full throttle or detent downshift. This occurs at full throttle when the throttle valve unit 401, connects maximum throttle pressure, which is preferably less than line pressure but could be equal to line pressure, between lands 411a and b to downshift line 418. When line 418 is connected to lockup valve 445, the lockup clutch will be disengaged and the converter will provide torque multiplication. At low vehicle speeds, the intermediate high valve unit 570 and the splitter valve unit 490 will both downshift under the influence of downshift oil in line 418 to provide a 6th to 3rd ratio downshift. At moderate vehicle speeds, the rear governor oil will exert a force on plug 522 of the splitter valve unit 490 to prevent a downshift of the splitter valve so that when downshift oil in line 418 downshifts the intermediate high valve unit 570, the transmission shifts from 6th to 4th ratio. Since the downshift of the intermediate high valve unit 570 on the 6th to 4th shift increases the net area on which rear governor pressure in line 320 acts on the splitter valve unit 490, the 6th to 4th shift is at moderate speeds followed by a 4th to 3rd shift. At high vehicle speeds, only the splitter valve unit 490 will downshift to provide a 6th to 5th downshift. At very high vehicle speeds the downshift pressure will be insufficient to provide a downshift. If the transmission is in 5th ratio, which only occurs at substantially full throttle, the oil in line 418 will downshift the intermediate high shift valve unit 570. Since the vehicle is in 5th ratio only at substantially full throttle and thus high speeds, the downshift of the intermediate high valve unit 570 will increase the area on which rear governor oil in line 320 acts on the splitter valve unit 490 and normally upshift the splitter valve 491 to provide a 5th to 4th ratio shift. However with falling speed a 5th to 3rd downshift could occur. At moderate speeds a 4th to 3rd forced downshift may be obtained. On these 6–5, 6–4, 6–3, 5–4 and 5–3 forced downshifts, the downshift timing valve 630 is closed since low clutch line 270 is exhausted and intermediate clutch oil in line 250 passes through orifices 636 to slowly apply the intermediate clutch.

The transmission may be manually downshifted from high range to intermediate range to provide a 6th to 4th or 5th to 4th or a 6th to 3rd ratio shift depending on vehicle speed. The movement of manual valve unit 427 from high range to intermediate range applies intermediate range oil in line 433 to blocker plug 583 to downshift the intermediate high valve unit 570. The downshift of valve units exhausts high clutch line 210 at exhaust 602 and supplies oil to intermediate line 250. Since low line 270 is exhausted, downshift timing valve 630 is closed by the spring 635 and the intermediate oil in line 250 passes through the orifice 636 to slowly engage the intermediate ratio. This shift of the intermediate high valve unit 570 also disconnects and vents controlled rear governor line 526 and discharges accumulator 529 to increase the governor force on the splitter valve 490 so that an automatic 6th to 4th ratio would normally occur. However at very low vehicle speeds a 6th to 3rd ratio shift can occur. Since the transmission only stays in 5th ratio at substantially full throttle and thus fairly high speeds on manual downshift, a 5th to 4th ratio shift usually occurs, though a 5th to 3rd shift is possible at low speeds.

A manual downshift from drive range to low range is made by moving manual valve unit 427 from "D" to "Lo" position to provide a 6th or 5th to 2nd or 1st ratio shift. The controls function in the same way as in the manual downshift from intermediate range to low range to establish second ratio and the normal low range control between second and first ratios. The low range oil in line 434 moves low intermediate valve 533 to supply low line 270 and disconnect supply line 559 for the intermediate and high lines 250 and 210 and moves relay valve 531 to hold splitter valve 491 in splitter high during the shift interval. If, when a drive range to low range shift is made, the transmission is in 3rd or 4th ratios and the intermediate ratio engaged, the intermediate exhaust is connected by lines 250 and 559 and valve 533 to exhaust port 561, the flow being retarded by reverse exhaust valve 438 but if the transmission is in 5th or 6th ratio and the high clutch engaged, the high clutch exhausts freely via line 210 and intermediate high valve unit 570 to exhaust 602 to reduce overlap to permit the engine to speed up.

*Fifth Gear Hold Range*

The fifth gear hold range is employed to limit the ratios available under the control of the automatic shift valve to the third, fourth and fifth ratios in order to provide another intermediate performance range and an intermediate downhill braking range. Fifth gear hold range is obtained by moving manual valve unit 427 to the fifth gear hold position "5" to connect the ratio supply line to the drive range line 432 and to connect a drive signal line 435 to the exhaust. The exhausting of the drive signal line 435 permits activation of the fifth gear hold control on the splitter shift valve unit 490, FIG. 4, by allowing the spring 502 to return the piston 501 to the end of the bore 500. Thus, when the intermediate high shift valve unit 570 upshifts to supply line pressure via line 210 to engage the high clutch, the line 210 is also connected to the bore 500 and through a port 504 in the piston 501 to fill the cavity within the piston and bores 500 and 498 to hydraulically hold the splitter shift valve 491 in the downshift position shown. This prevents an upshift to sixth ratio. In all other respects the operation in fifth gear hold range is the same as in drive range.

Movement of the manual control lever to drive range will supply fluid via drive signal line 435 to the bore 500 to move the piston 501 a small distance against the opposing shoulders on the stepped bore and piston to align the line port 504 and the exhaust 505 to exhaust the pressure in the bore 500—498 acting to hold the splitter shift valve unit 490 in the downshift position. This permits normal operation of the splitter shift valve unit 490. Though the drive signal line 435 is also connected to exhaust in intermediate and low ranges the splitter shift valve unit 490 operates in the normal manner since fluid is not in these ranges supplied to the high clutch line 210.

*Reverse*

The transmission is placed in reverse drive by positioning the manual valve 428 (FIG. 6) in reverse "R" position with the vehicle at rest.

With the engine running and the transmission in neutral the front pump 106 supplies oil to the main 340 and secondary 356 lines of the system as more fully explained above under Neutral operation. The main line 340 regulated by pressure control unit 341 supplies oil for reverse operation of the transmission via orificed line 439 to fill the reverse clutch line 310 and reverse motor at a low pressure limited by valve 438 to a value insufficient to engage reverse and via ratio change line 425 and splitter valve unit 490 to splitter 27 low line 150 to engage splitter low ratio and via ratio change line 425, orificed line 560 and low intermediate valve unit 530 to fill the low line 270 at a low pressure limited by valve 558 to a value insufficient to engage low. The secondary line 356 is connected by the lockup shift valve unit 445 and converter inlet line 100 to supply the converter to provide converter drive.

The manual valve in reverse position connects high, intermediate and low range lines 433, 432 and 434 to exhaust 437 to disengage high, intermediate and low ratios in the three speed unit and disconnects the reverse clutch line 310 from exhaust 436 and valve 438 and connects line 310 to ratio change line 425 to engage the reverse ratio device 81. Reverse line 310 is also connected to port 561 of low intermediate valve unit 530. This valve being held by spring 552 in the position shown in FIG. 4 connects line 310 between lands $c$ and $d$ to the controlled front governor line 521. Thus line pressure acts on plug 518 of splitter shift valve unit 490 to upshift the valve to connect line 425 to line 170 to engage splitter high. With reverse and splitter high engaged, reverse drive is established. The reverse clutch is quickly engaged because the motor was filled by orificed make-up line 439 and valve 438 which limited the pressure to a valve insufficient to engage the clutch. Since the low clutch motor is similarly filled with low pressure oil by orificed line 560 and valve 558, the low clutch can be quickly engaged. The splitter high clutch motor has a small rotating chamber and thus is substantially filled so that splitter high is quickly engaged. Also splitter high motor could be kept filled in the same manner as the reverse and low motors. Thus by moving the manual valve between low and reverse range, quick shifts between low and first ratio may be made to rock the vehicle for traction under adverse road conditions.

The lockup clutch is not engaged in reverse drive since the governor line 220 connected to the lockup valve unit 445 is vented via check valve 464 to drive range line 432 which is exhausted at manual valve unit 427 in reverse.

Hydrodynamic Brake Control

The brake is controlled by the valve unit 690 (FIG. 7). When the manual control mechanism is moved to apply the brake, the valve 691 moves to the left to the open position compressing spring 693. This movement of the valve 691 to the apply position, due to the tapered shoulder 706 of land $a$ gradually permits oil under pressure to flow in increasing volume from the cooler outlet line 714 and secondary line 356 to brake inlet line 180 which is connected to brake chamber 25 approximately midway between the inner and outer radii of the chamber. The outlet line 181 connects a tangential opening in the outer wall of the brake chamber 25 between lands $b$ and $c$ and when the valve 691 is in the brake applied position, to cooler inlet line 703. Then the oil from the brake is cooled in cooler 711 and returned by cooler outlet line 714 to secondary line 356, which will supply any additional oil requirements from pumps 106 and 321, to valve unit 690 and brake inlet line 180.

The brake capacity is regulated by variably positioning the valve 691 or by completely opening and closing the valve to regulate the volume of oil in the brake chamber to regulate the braking effort. A vehicle employing this transmission provides down-hill hydraulic braking in all ratios but normally the transmission automatically upshifts as described above to 6th ratio in high range, 5th ratio in fifth gear range, to 4th ratio intermediate range, and to 2nd ratio in low range. Since the braking effort of a hydrodynamic brake increases approximately with the cube function of the speed, the brake will limit the vehicle speed to low value in low range, an intermediate value in intermediate range and a higher value in high range. Thus the operator can, after determining the vehicle load and the steepness of the grade, select the proper range to provide the braking effort required to provide a safe speed. This brake in combination with this transmission provides four ranges of hydrodynamic brake control which will enable an operator to descend grades without using the vehicle service or emergency friction brakes to provide greater safety and extend the like of the friction brakes.

Since the churn brake will absorb more torque than is delivered by the engine, the brake outlet pressure, which is proportional to the torque absorbed by the brake, is connected to regulator unit 341 to increase the line pressure for tighter engagement of the ratio establishing devices. The brake outlet pressure in line 181 acts down on land $a$ of valve 343 and up on plug 347 to reduce the pressure increasing effect of throttle pressure and lockup clutch line pressure as the brake pressure increases to prevent an excessive pressure rise. When the brake is applied and the transmission in splitter high, the normal operation, the higher splitter high pressure acts up on valve 343, preventing any action by the lower brake pressure on plug 347 acting up on valve 343, and the brake pressure acting down on valve 343 provides a gradually increasing line pressure with increasing brake pressure. When splitter high line 170 and lockup feed line 395 are exhausted so main line pressure is not reduced, the brake pressure on land $a$ would provide a steep pressure increase with increasing brake pressure. In order to provide a gradual increase in main line pressure the brake line 181 is also connected to act up on plug 347 and valve 343. When valve unit 690 shuts off the oil supply to the brake, the rotating blades 24 centrifuge the oil out of the chamber to outlet line 181, valve unit 690, and exhaust 704 to sump.

At the speeds normally encountered in hydrodynamic braking the lockup valve unit 445 engages the lockup clutch 16 so full engine braking is simultaneously available.

In order to facilitate reference to the drawing, the location of parts on the drawing has been indicated by terms; such as, upper, lower, right, left, etc. but it will be understood that this is not a limitation since the location of the valves is not important. The terms low and slow ratio are equivalent and define a speed ratio lower than the high or fast ratio. The above-described preferred embodiments are illustrative of the invention, which may be practiced in several modified forms within the terms of the appended claims.

We claim:

1. In a transmission having input and output members, a fluid drive having an input element driven by said input member and an output element, a fluid operated lock-up clutch effective when engaged to connect said input and output elements, a multiratio gear unit connecting said output elements to said output member and having reverse means to establish reverse drive and forward means to establish forward drive, governor means operatively connected to a member of said transmission and providing a force proportional to the speed of the transmission, lockup clutch control means operated by said governor means to engage said lock-up clutch at a predetermined speed, ratio control means controlling in forward or reverse positions said forward or reverse means to establish said forward or reverse ratios, and means operatively controlled by said ratio control means in the position to establish reverse ratio drive to vent said governor means to disable said lock-up clutch control means to prevent engagement of said lock-up clutch.

2. In a transmission having input and output members, a fluid drive having an input element driven by said input member and an output element, a fluid operated lock-up clutch effective when engaged to connect said input and output elements, a fluid operated multiratio gear unit connecting said output element to said output member having reverse motor means to establish reverse drive and forward motor means to establish forward drive, a source of fluid under pressure, governor means operatively connected to a member of said transmission and providing a force proportional to the speed of the transmission, lock-up clutch control means operated by said governor to engage said lock-up clutch at a predetermined speed, ratio control means selectively connecting said source to said forward or reverse motor means in forward and reverse positions respectively to establish said forward or reverse ratios, cut off means responsive to the engagement of a ratio to disengage said lock-up clutch, and means operatively controlled by said ratio control means in the position to establish reverse ratio drive to actuate said cut off means to prevent engagement of said lock-up clutch.

3. In a transmission having input and output members, a fluid drive having an input element driven by said input member and an output element, a fluid operated lock-up clutch effective when engaged to connect said input and output elements, a fluid operated multiratio gear unit connecting said output element to said output member having reverse fluid motor means to establish reverse drive and forward motor means to establish forward drive, a source of operating fluid under pressure, a governor operatively connected to a member of the transmission and providing a source of governor pressure proportional to the speed of the transmission, lock-up clutch control means operated by said governor pressure to control the supply of fluid to said fluid operated lock-up clutch to engage said lock-up clutch at a predetermined speed, ratio control means connecting said source of operating fluid to said motor means and controlling in forward and reverse positions respectively the connections of said source of operating fluid to said forward or reverse motor means to establish said forward or reverse ratios, valve means responsive to the flow of fluid to said forward or reverse motor means to control the flow of fluid from said lock-up clutch control means to said fluid operated lock-up clutch to disengage said clutch on engagement of said forward or reverse motor means, and means operatively controlled by said ratio control means in the position to establish reverse ratio drive to actuate said valve means to disengage said lock-up clutch.

4. In a transmission, a multiratio gear unit having first fluid operated means to provide a first drive ratio and second fluid operated means to provide a second drive ratio, a source of fluid under pressure, ratio shift valve means connecting said source selectively to said first and second fluid operated means to selectively establish said first and second ratio drives, a pressure regulator valve having a regulation cycle to initially exhaust fluid to regulate the pressure supplied selectively to said first and second fluid operated means at an initial low value and to gradually increase the pressure to a value substantially equal to the pressure of said source and to close said pressure regulator valve, means responsive to the closing of said pressure regulator valve at the completion of said cycle to reset said pressure regulator valve for the initiation of a new cycle.

5. The invention defined in claim 4 and means responsive to the engagement of one of said fluid operated means to disable said pressure regulator valve.

6. In a transmission, a multiratio gear unit having first and second fluid operated means movable from a disengaged to an engaged position to provide a first and a second drive ratio, a source of fluid under pressure, ratio shift valve means connecting said source selectively to said first and second fluid operated means to selectively establish said first and second ratio drives, a pressure regulator valve having means to prevent operation of said regulator valve when the selected one of said first and second fluid operated means are at rest at said engaged or disengaged positions and to initially exhaust fluid to regulate the pressure of fluid initially supplied to said first and second fluid operated means at an initial low value and to gradually increase the pressure to a pressure equal to the pressure of said source and to close said pressure regulator valve, means responsive to the movement of the selected one of said fluid operated means from said disengaged to said engaged positions to render said regulator valve inoperative.

7. In a transmission, an iput member, an output member, a fluid drive connecting said input member to an intermediate member, a lock-up clutch connecting said input member to said intermediate member and having fluid operated means to engage said lock-up clutch, a multiratio gear unit connecting said intermediate member to said output member and having first fluid operated means to provide a first drive ratio and second fluid operated means to provide a second drive ratio, a source of fluid under pressure, lock-up shift valve means connecting said source to said fluid operated means to engage said lock-up clutch, ratio shift valve means connecting said source selectively to said first and second fluid operated means to selectively establish said first and second ratio drives, means responsive to the operation of said first and second fluid operated means to engage said first and second drives operative to disengage said lock-up clutch, and a pressure regulator valve having means to prevent operation of said regulator valve when the lock-up clutch is engaged and operative when the lock-up clutch is disengaged to initially exhaust fluid to regulate the pressure supplied to said first and second fluid operated means at an initial low value and to gradually increase the pressure to a pressure equal to the pressure of said source and to close said pressure regulator valve.

8. The invention defined in claim 7 and means responsive to the engagement of one of said fluid operated means to disable said pressure regulator valve.

9. In a pressure regulator valve for regulating the pressure of a source, a movable valve located in a bore having an exhaust and biased in one direction to close said exhaust, a passage adapted to be connected to a source connected to said bore to act on said valve to move said valve in the other direction from a closed position to an open position connecting said passage to exhaust, said valve having means to gradually increase the length of said valve proportional to the duration of action of said source on said valve to gradually increase the regulated pressure of said source, and means effective after a predetermined duration of time that the pressure is effective on said valve to close said exhaust.

10. The invention defined in claim 9 and means to hold said valve closed.

11. The invention defined in claim 9 and means to increase the biasing force to move said valve to said closed position and prevent movement of said valve by pressure from a source.

12. The invention defined in claim 9 and means to quickly increase the length of said movable valve to hold said valve closed.

13. In a pressure regulator valve for regulating the pressure of a source, a movable valve means located in a bore having an exhaust and first biasing means biasing said movable valve means in one direction to close said exhaust, a passage adapted to be connected to a source connected to said bore to act on said valve means to move said valve means in the other direction from a closed position to an open position connecting said passage to exhaust, said valve means including a first and second member having a second biasing means exerting a smaller biasing force than said first biasing means operatively connected to said first and second members to separate said members and restricted passage means connecting said passage to said bore between said first and second members to gradually separate said members to increase the effective length of said movable valve means proportional to the duration of action of said source on said valve member, and means effective after a predetermined duration of time that the pressure is effective on said valve to positively close said exhaust.

14. The invention defined in claim 13 and means to supply fluid to said bore to hold said valve means in said closed position.

15. The invention defined in claim 13 and means to supply fluid quickly to said bore between said members to hold said valve means in said closed position.

16. In a pressure regulator valve for regulating the pressure of a source, a bore having an exhaust, a first and a second movable valve member located in said bore, a heavy spring fixed at one end of said bore and engaging said first valve member to bias said valve members to a first position at the other end of said bore closing said exhaust, a weak spring located between said first and second valve members, a passage adapted to be connected to a source connected to said other end of said bore to act on said second valve member to move said valve member from said first position to a second position connecting said source to said exhaust, and orifice means connecting said passage to the space between said first and second movable valve members to act with said weak spring to separate said valve members to gradually increase said pressure and to close said valve to limit the duration of the regulatory cycle of the regulator valve.

17. The invention defined in cliam 16 and control passage means to supply a control pressure to said bore between said valve members to render said regulator valve inoperative.

18. The invention defined in claim 16 and means to reset said regulator valve acting on said valve members to move said valve members to said first position while pressure of a source is in said passage.

19. In a transmission, an input member, an output member, a first multiratio transmission having a low ratio engaging device providing a low ratio and a high ratio engaging device providing a high ratio and a second multratio gear unit having a slow and a fast ratio engaging device connected in series between said input and output members, a source of fluid under pressure, a governor providing a force proportional to the speed of the transmission, first control valve means operative in a first position to connect said source to engage said low ratio engaging device and movable by said governor force to a second position engaging said high ratio engaging device, second shift valve means connecting said source in a first position to engage said slow ratio engaging device and movable by said governor force to a second position to engage said fast ratio engaging device, said first shift valve means controlling the action of said governor force on said second shift valve means to provide a first upshift when said first shift valve is in said first position, a downshift when said first shift valve upshifts and a second upshift when said first shift valve is in said second position, first manual control means to hold said first shift valve in said downshift position, and second manual control means to hold said second shift valve in said downshift position.

20. The invention defined in claim 19 and said second manual control means including means to provide a closed chamber at one end of said second shift valve and means responsive to said first shift valve in said second position supplying fluid to said closed chamber to hold said second shift valve in said first position.

21. In a transmission, an input member, an output member, a first multiratio transmission having a low ratio engaging device providing a low ratio and a high ratio engaging device providing a high ratio and a second multiratio gear unit having a slow and a fast ratio engaging device connected in series between said input and output members, a source of fluid under pressure, a governor providing a force proportional to the speed of the transmission, first control valve means operative to connect said source in a first position to engage said low ratio engaging device and movable by said governor force to a second position engaging said high ratio engaging device, second shift valve means connecting said source in a first position to said slow ratio engaging device and movable by said governor force to a second position to engage said fast ratio engaging device, said first shift valve means controlling the action of said governor force on said second shift valve means to provide a first upshift when said first shift valve is in said first position, a downshift when said first shift valve upshifts and a second upshift when said first shift valve is in said second position, and manual control means having a first position holding said first valve in said first position, a second position holding said second shift valve in said second position and a third position permitting both shift valves to move to their second positions.

22. In a transmission, a controlled means, a source of fluid under pressure, expansible chamber means including a movable wall having a valve portion controlling the supply of fluid from said source to said controlled means, first control means operative in a first position to vent and in a second position to close said expansible chamber, second control means movable from a first closed position to a second position connecting said source to said expansible chamber to hold said valve in one position when and only when said first and second control means are in said second position.

23. In a transmission, an input member, an output member, a first multiratio transmission having a low ratio engaging device providing a low ratio and a high ratio engaging device providing a high ratio and a second multiratio gear unit having a slow and a fast ratio engaging device connected in series between said input and output members, a source of fluid under pressure, a governor providing a force proportional to the speed of the transmission, first shift valve means operative in a first position to engage said low ratio engaging device and movable by said governor force to a second position engaging said high ratio engaging device, second shift valve means connecting said source in a first position to said slow ratio engaging device and movable by said governor force to a second position to engage said fast ratio engaging device, said first shift valve means controlling the action of said governor force on said second shift valve means to provide a first upshift when said first shift valve is in said first position, a downshift when said first shift valve upshifts and a second upshift when said first shift valve is in said second position, and means operated by said first shift valve only on a downshift from said second to said first position to momentarily position said second shift valve in said second position.

24. In a transmission, an input member, an output member, a first and a second multiratio gear unit connected in series between the input and output members, first and second ratio fluid operated means to selectively establish a first and second ratio drive in one of said gear units, low and high ratio fluid operated means to selectively establish a low and a high ratio drive in the other of said gear units, a source of fluid, a governor supplying a governor pressure proportional to the speed of said transmission, a first shift valve operated by said governor pressure in a first position connecting said source to said first ratio fluid operated means to establish said first ratio drive and upshifted by said governor pressure to a second position connecting said source to said second ratio fluid operated means to establish said second ratio drive, a second shift valve operated by said governor pressure to connect said source in a first position to said low ratio fluid operated means to establish said low ratio drive and upshifted by said governor pressure for movement to a second position connecting said source to said high ratio fluid operated means to establish said high ratio drive, means operated by said first shift valve to control the supply of governor pressure to said second shift valve to provide a first upshift of said second shift valve when said first shift valve is in a said first position, a downshift of said second shift valve when said first shift valve is upshifted, and a second upshift of said second shift valve when said first shift valve is in said second position, said last-mentioned means including an accumulator connected to said governor to permit said governor pressure to charge said accumulator and means responsive to said first shift valve and operative when said first shift valve moves to said second position to discharge said accumulator to momentarily increase said governor pressure.

25. In a transmission, an input member, an output member, a first and a second multiratio gear unit connected in series between the input and output members, first and second ratio fluid operated means to selectively establish a first and second ratio drive in one of said gear units, low and high ratio fluid operated means to selectively establish a low and a high ratio drive in the other of said gear units, a source of fluid, a governor supplying a governor pressure proportional to the speed of said transmission having a free governor passage and a restricted governor passage supplied with said governor pressure, a first shift valve connected to said free governor passage in a first position connecting said source to said first ratio fluid operated means to establish said first ratio drive and upshifted by said governor pressure to a second position connecting said source to said second ratio fluid operated means to establish said second ratio drive, a second shift valve connected to said restricted governor passage to connect said source in a first position to said low ratio fluid operated means to establish said low ratio drive and upshifted by said governor pressure for movement to a second position connecting said source to said high ratio fluid operated means to establish said high ratio drive, means operated by said first shift valve to control the supply of governor pressure to said second shift valve to provide a first upshift of said second shift valve when said first shift valve is in a said first position, a downshift of said second shift valve when said first shift valve upshifts, and a second upshift of said second shift valve when said first shift valve is in said second position, said last-mentioned means including an accumulator connected to said restricted governor passage between the restriction and said second shift valve, and means responsive to said first shift valve and operative when and only when said first shift valve is in said second position to discharge said accumulator to increase the pressure in said restricted governor passage operative on said second shift valve to hold said second shift valve in said second position.

26. In an automatic transmission an input member, an output member, a multiratio gear unit connecting said input and output members and having a first and a second drive fluid operated means to establish a first and second drive in said gear unit, a source of fluid under pressure, governor means providing a force proportional to the speed of said transmission, exhaust control valve means, a shift valve operated by said governor and connecting said source to said first fluid operated means in a first position and movable by said governor pressure to a second position connecting said source to said second operated means and said first fluid operated means to said exhaust control valve means, means connecting said second fluid operated means to said exhaust control valve to regulate the rate of decline of the pressure in said first fluid operated means and said exhaust control valve means including orifice means exhausting said first fluid operated means at a rate not greater than the minimum rate of exhaust of said exhaust control valve means.

27. In a transmission for an engine having a fuel control operative at the full throttle position to provide a downshift signal, an input member, an output member, a fluid drive connecting said input member to said output member, a lock-up clutch connecting said input member to said output member and having fluid operated means to engage said lock-up clutch, a source of fluid under pressure, a governor, lock-up shift valve means operated by said governor to connect said source to said fluid operated means to engage said lock-up clutch and operative in response to said downshift signal to disengage said lock-up clutch, and additional manually operated means operative independently of said fuel control to disengage said lock-up clutch at the will of the operator.

28. In a transmission, an input member, an intermediate member, an output member, a fluid drive connecting said input member to an intermediate member, a lock-up clutch connecting said input member to said intermediate member and having fluid operated means to engage said lock-up clutch, a multiratio gear unit connecting said intermediate member to said output member and having first ratio fluid operated means to provide a first drive ratio and second ratio fluid operated means to provide a second drive ratio, a source of fluid under pressure, a governor, lock-up shift valve means operated by said governor to connect said source to said fluid operated means to engage said lock-up shift valve, ratio shift valve means connecting said source selectively to said first and second fluid operated means to selectively establish said low and high ratio drives, cut-off means responsive to the operation of said first and second fluid operated means to engage said first and second drives operative to disengage said lock-up clutch during change in ratio, and manual control means operative to actuate said cut-off means at the will of the operator to disengage said lock-up clutch.

29. In a transmission having input and output members; a drive connecting said input and output members including a fluid drive having an input element driven by said input member and an output element, a fluid operated lockup clutch effective when engaged to connect said input and output elements, and a multiratio gear unit having a first drive means to establish a first drive and a second drive means to establish a second drive; governor means operatively connected to a member of said transmission and providing a governor pressure proportional to the speed of the transmission and having a controllable vent to vent said governor pressure; lockup clutch control means connected to said governor means and operative to engage said lockup clutch at a predetermined speed; ratio control means controlling in a first or second position said first or second drive means to establish said first or second ratio; and means responsive to the establishment of one drive to open said vent of said governor to disable said lockup clutch control means to prevent engagement of said lockup clutch and responsive to the establishment of the other drive to close said vent to connect said governor to said lockup clutch control means to permit engagement of said lockup clutch.

30. In a transmission having input and output members; a drive connecting said input and output members including a fluid drive having an input element driven by said input member and an output element, a fluid operated clutch effective when engaged to connect said input and output elements, and a multiratio gear unit having a plurality of ratio drives, means to establish a plurality of ratio drives; governor means operatively connected to a member of said transmission and providing a governor pressure proportional to the speed of the transmission; lockup clutch control means connected to said governor means and operative to engage said lockup clutch at a predetermined speed; ratio control means selectively controlling in a plurality of positions said drive means to selectively establish said drive ratios; cutoff control means operatively connected to said gear unit and lockup clutch and operative in response to a change in drive ratio of said multiratio gear unit to disengage said lockup clutch for the duration of each ratio drive change and to permit engagement of said lockup clutch when the ratio drives are engaged; and means responsive to the establishment of one of said ratio drives to disable said lockup clutch control means to prevent engagement of said lockup clutch and repsonsive to the establishment of another drive to permit operation of said lockup clutch control means to permit engagement of said lockup clutch.

31. In a transmission; a multiratio gear unit having first fluid operated means to provide a first drive ratio and second fluid operated means to provide a second drive ratio; a source of fluid under a regulated pressure; ratio shift valve means connecting said source selectively to said first and second fluid operated means to selectively establish said first and second ratio drives; pressure regulator valve means having exhaust means connected to said source and time control means controlling said exhaust means having a regulation cycle operative, when in a first position with said exhaust means closed and said time control means in a first position, to initiate a cycle including a first operation in response to the pressure drop occurring on the initial supply of fluid from said source to a selected one of said fluid operated means to open said exhaust means to initially exhaust fluid to regulate the pressure supplied to said one of said fluid operated means at an initial low value and a second operation at a predetermined timed rate controlled by said time control means to gradually increase the pressure to a value sufficient to engage said selected one of said fluid operated means and a third operation to close said exhaust means under the control of said time control means in a last position to increase the pressure to a pressure value equal to the pressure of said source; and means operative on the completion of the shift to reset said pressure regulator value means from said last to said first position for the initiation of another cycle.

32. The invention defined in claim 31 and said time controlled means including an expansible chamber which is collapsed in said first position and filled with fluid and expanded in said last position.

33. In a transmission; an input member; an output member; a drive connecting said input and output members including a fluid drive having an input element and an output element, a lockup clutch connecting said input element to said output element and having operating means to engage said lockup clutch; and a multiratio transmission having first and second ratio engaging means operative to provide first and second ratio drive; a governor; lockup shift means operated by said governor to actuate said operating means to engage said lockup clutch; ratio shift means operative to selectively actuate said first and second ratio engaging means; lockup cutoff means operative in response to a change in ratio of said multiratio transmission to disengage said lockup clutch for the duration of the ratio change; and manually operated means operatively connected to said lockup clutch cutoff means to actuate said lockup clutch cutoff means to disengage said lockup clutch at the will of the operator.

34. In a transmission; drive means for engaging a drive; a control system including fluid actuator means connected to said drive means for engaging said drive means in response to the supply of fluid to said fluid actuator means, a source of fluid under a high pressure, and shift valve means connecting said source to said fluid actuator means for controllably supplying fluid to said fluid actuator means to engage said drive means; regulator valve means connected to said control system for regulating the pressure supplied to said fluid actuator means having a regulation cycle having a first position for regulating the pressure at a low value in response to the initial supply of fluid to said fluid actuator means and gradually moving to a second position for gradually increasing the regulated pressure to a higher pressure value to actuate said fluid actuator means to complete engagement of said drive means; and means operative in response to engagement of said drive means for resetting said regulator valve means from said second position to said first position and for maintaining said pressure as high as said higher regulated pressure value.

35. In a transmission, a multiratio transmission having first fluid operated means for engaging a first speed ratio and second fluid operated means for engaging a second speed ratio, a source of fluid under a high pressure, ratio shift valve means for connecting said source selectively to one of said first and second fluid operated means to selectively engage said first and second ratio drives, pressure regulator valve means connected to said ratio shift valve means having a regulation cycle beginning with said pressure regulator valve means in a first position for initially regulating the pressure supplied to the selected one of said fluid operated means at a low value and automatically gradually moving to a second position to gradually increase the regulated pressure to a higher value, and means operative in response to the engagement of the one of said fluid operated means being engaged for resetting said pressure regulator valve from said second to said first position and maintain said pressure as high as said higher value.

36. In a transmission; drive means for engaging a drive; a control system including fluid actuator means connected to said drive means for engaging said drive means in response to the supply of fluid to said fluid actuator means, a source of fluid under a high pressure, and shift valve means connecting said source to said fluid actuator means for controllably supplying fluid for flow to said fluid actuator means to engage said drive means; regulator valve means connected to said control system for regulating the pressure supplied to said fluid actuator means having a regulation cycle having a first position for regulating the pressure at a low value by providing an exhaust flow of fluid from said control system in response to the initial supply of fluid to said fluid actuator means and gradually moving to a second position for gradually increasing the regulated pressure to a higher pressure value to actuate said fluid actuator means to complete engagement of said drive means; and means operative in response to reduction of the flow of fluid in said control system for resetting said regulator valve means from said second position to said first position and for maintaining said pressure as high as said higher regulated pressure value.

37. In a transmission, a multiratio transmission having first fluid operated means for engaging a first speed ratio and second fluid operated means for engaging a second speed ratio, a source of fluid under pressure, ratio shift valve means connecting said source selectively to said first and second fluid operated means to selectively engage said first and second ratio drives, a pressure regulator valve means connected to said ratio shift valve means having a regulation cycle beginning with said pressure regulator valve means in a first position for initially regulating the pressure supplied to the selected one of said fluid operated means at a low value and automatically gradually moving to a second position to gradually increase the regulated pressure to a high value, and means to move said pressure regulator from said first to said second position more rapidly on engagement of one of said fluid operated means than on the engagement of the other fluid operated means.

38. In a transmission; drive means for engaging a drive; a control system including a fluid actuator means connected to said drive means for engaging said drive means in response to the supply of fluid to said fluid actuator means, a source of fluid under a high pressure, and shift valve means connecting said source to said fluid actuator means for controllably supplying fluid to said fluid actuator means to engage said drive means; regulator means connected to said control system having movable valve means located in a bore having an exhaust and biased in one direction to close said exhaust, said control system being connected to said bore to act on said valve means to move said valve means in the other direction from a closed position to an open position connecting said control system to exhaust, said movable valve means having means to gradually increase the length of said valve means proportional to the duration of regulation of said regulator means to gradually increase the pressure regulated by said regulator means to a higher value to actuate said actuator means to engage said drive means.

39. The invention defined in claim 38 and means to more quickly increase the length of said valve means.

40. The invention defined in claim 38 and means to more quickly increase the length of said valve means and to hold said valve means in said closed position.

41. The invention defined in claim 38 and means operative on said engagement of said drive means to reduce the length of said valve means and to maintain the pressure at as high as said higher pressure.

42. In a transmission; drive means for engaging a drive; a control system including a fluid actuator means connected to said drive means for engaging said drive means in response to the supply of fluid to said fluid actuator means, a source of fluid under a high pressure, and shift valve means connecting said source to said fluid actuator means for controllably supplying fluid to said fluid actuator means to engage said drive means; regulator valve means connected to said control system having a first and a second valve member located in a bore having an exhaust controlled by said first valve element, means connecting said control system to said bore to supply fluid to said bore to act on said first valve member to urge it in one direction to exhaust position and to supply fluid through a restriction to said bore between said first and second valve members, weak biasing means between said first and second valve elements, strong biasing means engaging said second valve element and acting through the fluid and weak biasing means between said valve elements to urge said first valve element in the opposite direction to close said exhaust to regulate the pressure at a low initial value and with flow through said restrictions at gradually increasing values.

43. In a transmission; drive means for engaging a drive; a control system including fluid actuator means connected to said drive means for engaging said drive means in response to the supply of fluid to said fluid actuator means, a source of fluid under a high pressure, and shift valve means connecting said source to said fluid actuator means for controllably supplying fluid to said fluid actuator means to engage said drive means; regulator valve means connected to said control system having a valve element urged by fluid pressure in said control system to an exhaust position exhausting fluid from said control system and biasing means consisting of a spring connected to said valve element through an expansible chamber for biasing said valve element to a closed position and orifice means connecting said control system to said expansible chamber to regulate the fluid pressure in said control system at gradually increasing pressure values.

44. In a transmission; an input member; an output member; a drive connecting said input and output members including a first multiratio transmission unit having a low speed ratio drive means operative to provide a low speed ratio drive and high speed ratio drive means operative to provide a high speed ratio drive and a second multiratio transmission unit having forward drive means operative to provide forward drive and reverse drive means operative to provide reverse drive connected in series; automatic control means operatively connected to said first multiratio transmission unit operative in a first condition for normally engaging said low speed ratio drive means and automatically shiftable in accordance with increasing transmission speed for disengaging said low speed ratio drive means and engaging said high speed ratio drive means and operative in a second condition for engaging only said high speed ratio drive means; and forward-reverse control means having one manual actuator movable between forward and reverse positions and being connected to said automatic control means and said second multiratio transmission unit and operative when said manual actuator is in said forward position for engaging said forward drive means and placing said automatic control means in said first condition and when said manual actuator is in said reverse position for engaging said reverse drive means and placing said automatic control means in said second condition.

45. In a transmission, an input member, an output member, a first multiratio transmission unit having a fluid operated low speed ratio drive means to provide a low ratio drive and fluid operated high speed ratio drive means to provide a high ratio drive, a second multiratio transmission unit having fluid operated forward drive means to provide forward drive and fluid operated reverse drive means to provide reverse drive, a source of fluid under pressure, said first and second multiratio transmission units being connected in series between said input and output members, governor means providing a pressure varying with transmission speed, automatic control means normally operative in a low speed position for connecting said source to said fluid operated low speed ratio drive means to engage low speed ratio drive and operative in response to said governor pressure at an increased transmission speed to move to a high speed position for exhausting said fluid operated low speed ratio drive means to disengage said low speed drive and for connecting said source to said fluid operated high speed ratio drive means to engage said high speed ratio drive and operative in response to a reverse control fluid pressure for movement to said high speed position for connecting said source to said fluid operated high speed ratio drive means to engage high ratio drive at all times, and forward and reverse control means having one manual actuator movable between forward and reverse positions and operative when said manual actuator is in said forward position for connecting said source to said fluid operated forward drive means to engage forward drive and when said manual actuator is in said reverse position for connecting said source to said fluid actuated reverse drive means to engage reverse drive and to supply said reverse control fluid pressure to said automatic control means for placing said automatic control means in said high speed position.

References Cited in the file of this patent

UNITED STATES PATENTS

| | | |
|---|---|---|
| 2,299,079 | Davis | Oct. 20, 1942 |
| 2,655,169 | Towler et al. | Oct. 13, 1953 |
| 2,694,949 | McFarland | Nov. 23, 1954 |
| 2,738,689 | Dodge | Mar. 20, 1956 |
| 2,791,913 | Slack | May 14, 1957 |
| 2,875,643 | Kelly | Mar. 3, 1959 |
| 2,926,543 | Holdeman et al. | Mar. 1, 1960 |
| 2,978,928 | Tuck et al. | Apr. 11, 1961 |

UNITED STATES PATENT OFFICE
CERTIFICATE OF CORRECTION

Patent No. 3,053,116            September 11, 1962

Howard W. Christenson et al.

It is hereby certified that error appears in the above numbered patent requiring correction and that the said Letters Patent should read as corrected below.

Column 3, line 28, for "startors" read -- stators --; column 13, line 18, after "except" insert -- under --; column 28, lines 20 and 21, for "engaged" read -- energized --; column 38, line 5, for "like" read -- life --; column 42, line 11, after "first", first occurrence, insert -- shift --; column 44, line 55, after "operated" insert -- lockup --.

Signed and sealed this 2nd day of April 1963.

(SEAL)
Attest:

ESTON G. JOHNSON
Attesting Officer

DAVID L. LADD
Commissioner of Patents